US012603399B2

(12) United States Patent
Chen et al.

(10) Patent No.: US 12,603,399 B2
(45) Date of Patent: Apr. 14, 2026

(54) BATTERY AND ELECTRONIC DEVICE

(71) Applicant: Honor Device Co., Ltd., Shenzhen (CN)

(72) Inventors: Wei Chen, Shenzhen (CN); Hua Zhu, Shenzhen (CN); Yufei Chen, Shenzhen (CN); Lun Lu, Shenzhen (CN); Bin Deng, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 519 days.

(21) Appl. No.: 18/003,847

(22) PCT Filed: Jan. 28, 2022

(86) PCT No.: PCT/CN2022/074807
§ 371 (c)(1),
(2) Date: Dec. 29, 2022

(87) PCT Pub. No.: WO2022/171015
PCT Pub. Date: Aug. 18, 2022

(65) Prior Publication Data
US 2023/0261337 A1    Aug. 17, 2023

(30) Foreign Application Priority Data

Feb. 9, 2021    (CN) .......................... 202110182367.X
Jul. 30, 2021    (CN) .......................... 202110873479.X

(51) Int. Cl.
H01M 50/538        (2021.01)
H01M 10/42        (2006.01)
(Continued)

(52) U.S. Cl.
CPC ..... H01M 50/538 (2021.01); H01M 10/4257 (2013.01); H01M 50/103 (2021.01);
(Continued)

(58) Field of Classification Search
CPC ........... H01M 10/0436; H01M 10/425; H01M 10/4257; H01M 2010/4271;
(Continued)

(56) References Cited

U.S. PATENT DOCUMENTS 10,367,175 B2    7/2019    Millon
10,434,894 B2    10/2019    Li et al.
(Continued)

FOREIGN PATENT DOCUMENTS

CN    203056648 U    7/2013
CN    203951509 U    11/2014
(Continued)

*Primary Examiner* — Victoria H Lynch
(74) *Attorney, Agent, or Firm* — Slater Matsil, LLP

(57) ABSTRACT

A battery and an electronic device are disclosed. The battery includes: a first bare cell portion and a second bare cell portion. The first bare cell portion has a first surface and a side surface connected to the first surface, the first surface is configured to face towards a same direction as that of an opening of a battery compartment of an electronic device when the battery is installed in the battery compartment, and the side face is configured to face towards an inner side surface of the battery compartment of the electronic device when the battery is installed in the battery compartment. The second bare cell portion is located on a side that the first surface faces, and an orthographic projection of the second bare cell portion on the first surface overlaps the first surface.

20 Claims, 15 Drawing Sheets

(51) Int. Cl.
| | |
|---|---|
| *H01M 50/103* | (2021.01) |
| *H01M 50/176* | (2021.01) |
| *H01M 50/574* | (2021.01) |
| *H02J 7/00* | (2006.01) |

(52) U.S. Cl.
CPC ....... *H01M 50/176* (2021.01); *H01M 50/574* (2021.01); *H02J 7/0042* (2013.01); *H01M 2010/4271* (2013.01)

(58) Field of Classification Search
CPC .......... H01M 2220/30; H01M 50/102; H01M 50/103; H01M 50/14; H01M 50/176; H01M 50/204; H01M 50/247; H01M 50/267; H01M 50/269; H01M 50/538; H01M 50/557; H01M 50/574; H02J 7/0042; Y02E 60/10
See application file for complete search history.

(56) References Cited

U.S. PATENT DOCUMENTS

| | | | |
|---|---|---|---|
| 10,749,155 | B2 | 8/2020 | Oh et al. |
| 2009/0123829 | A1 | 5/2009 | Kim et al. |
| 2010/0129690 | A1* | 5/2010 | Uemura ............ H01M 8/04888 |
| | | | 320/152 |
| 2012/0015223 | A1 | 1/2012 | Bhardwaj et al. |
| 2013/0089761 | A1 | 4/2013 | Schiemann et al. |
| 2013/0273413 | A1 | 10/2013 | Fahlgren et al. |
| 2014/0099525 | A1 | 4/2014 | Kwon et al. |
| 2015/0037664 | A1 | 2/2015 | Kang et al. |
| 2015/0064528 | A1 | 3/2015 | Liu et al. |
| 2015/0303538 | A1 | 10/2015 | Chen et al. |
| 2016/0336562 | A1 | 11/2016 | Oh et al. |
| 2018/0026254 | A1 | 1/2018 | Oh et al. |
| 2020/0044236 | A1* | 2/2020 | Bian .................. H01M 4/1393 |
| 2021/0167363 | A1 | 6/2021 | Shibata et al. |

FOREIGN PATENT DOCUMENTS

| | | | |
|---|---|---|---|
| CN | 105006586 | A | 10/2015 |
| CN | 106159333 | A | 11/2016 |
| CN | 206271794 | U | 6/2017 |
| CN | 107317003 | A | 11/2017 |
| CN | 207530023 | U | 6/2018 |
| CN | 109075269 | A | 12/2018 |
| CN | 208674305 | U | 3/2019 |
| CN | 110071236 | A | 7/2019 |
| CN | 110212148 | A | 9/2019 |
| CN | 110336353 | A | 10/2019 |
| CN | 209822814 | U | 12/2019 |
| CN | 111916602 | A | 11/2020 |
| CN | 111916816 | A | 11/2020 |
| CN | 111969168 | A | 11/2020 |
| CN | 212303776 | U | 1/2021 |
| CN | 112768783 | A | 5/2021 |
| CN | 112042041 | B | 8/2021 |
| CN | 113690513 | A | 11/2021 |
| JP | 2005078837 | A | 3/2005 |
| KR | 20030066960 | A | 8/2003 |
| KR | 20100082677 | A | 7/2010 |
| KR | 20140102383 | A | 8/2014 |
| WO | 2004095611 | A1 | 11/2004 |
| WO | 2013042612 | A1 | 3/2013 |
| WO | 2017113099 | A1 | 7/2017 |

* cited by examiner

1

BATTERY AND ELECTRONIC DEVICE

CROSS-REFERENCE TO RELATED APPLICATIONS

This application is a national stage of International Application No. PCT/CN2022/074807, filed on Jan. 28, 2022, which claims priority to Chinese Patent Application No. 202110182367.X, filed on Feb. 9, 2021, and Chinese Patent Application No. 202110873479.X, filed on Jul. 30, 2021. The disclosures of each of the aforementioned applications are hereby incorporated by references in their entireties.

TECHNICAL FIELD

This application relates to the technical field of electronic devices, and in particular, to a battery and an electronic device.

BACKGROUND

At present, batteries are widely used in various electronic devices to provide electrical energy for the electronic devices. As functions of electronic devices become more and more powerful, to meet electricity quantity requirements of electronic devices, capacities of batteries required in electronic devices increase. However, a high-capacity battery has a higher risk of an internal short-circuit and burning due to piercing by a foreign object such as a broken back cover and a screwdriver in scenarios such as dropping and repair. As a result, the safety performance of batteries is low.

SUMMARY

The embodiments of the present application provide a battery and an electronic device, to help to improve the usage safety of the battery.

To achieve the above objective, the embodiments of the present application use the following technical solutions:

According to a first aspect, some embodiments of the present application provide a battery, including: a first bare cell portion and a second bare cell portion. The first bare cell portion has a first surface and a side surface connected to the first surface, the first surface is configured to face towards a same direction as that of an opening of a battery compartment of an electronic device when the battery is installed in the battery compartment, and the side face is configured to face towards an inner side surface of the battery compartment of the electronic device when the battery is installed in the battery compartment. The second bare cell portion is located on a side that the first surface faces, and an orthographic projection of the second bare cell portion on the first surface overlaps the first surface, and/or the second bare cell portion is located on a side that the side surface faces, and an orthographic projection of the second bare cell portion on the side surface overlaps the side surface.

In the battery provided in the embodiments of the present application, since both the first bare cell portion and the second bare cell portion are provided, compared with the battery provided with one bare cell portion in the related art, on the one hand, the capacity may be divided into the first bare cell portion and the second bare cell portion while the total capacity of the battery is not reduced, so that capacities of the first bare cell portion and the second bare cell portion are both lower than that of the battery with one bare cell portion in the related art. Therefore, the risk of an internal short circuit and burning of the battery caused by high capacities of the first bare cell portion and the second bare cell portion can be reduced at least to some extent, and the safety of the battery can be improved. On the other hand, this helps the first bare cell portion and the second bare cell portion to operate independent of each other, so that the second bare cell portion can be used to protect the first bare cell portion during the usage of the battery, to prevent the entire battery from being damaged and scrapped.

In a possible implementation of the first aspect, the first bare cell portion is a high-energy bare cell portion, and the second bare cell portion is a fast-charge bare cell portion. Since volume energy density of the fast-charge bare cell portion is usually low, when the second bare cell portion occupies a specific volume in the battery, the capacity of the second bare cell portion can be reduced by disposing the second bare cell portion as the fast-charge bare cell portion. In this way, less power is released when a short circuit occurs, the safety of the battery can be improved to some extent, and the possibility of fire outbreak and explosion of the battery can be reduced. Since volume energy density of the high-energy bare cell portion is high, the battery life can be ensured. Therefore, the battery can balance both the fast-charge feature and the high-energy feature.

In a possible implementation of the first aspect, a thickness of a negative electrode sheet of the second bare cell portion is smaller than that of a negative electrode sheet of the first bare cell portion. In this way, a plurality of bare cell portions are used to store power to ensure the capacity of the battery, to improve the overall charge and discharge speed of the battery. In addition, due to the higher discharge speed of the second bare cell portion, power stored in the second bare cell portion is exhausted in a short time, to reduce the risk of an internal short-circuit and burning of the battery due to piercing by a foreign object such as a broken back cover and a screwdriver in scenarios such as dropping and repair.

Based on any one of the foregoing two implementations, the second bare cell portion includes a first sub-portion, the first sub-portion is located on the side that the first surface faces towards, and an orthographic projection of the first sub-portion on the first surface overlaps the first surface.

Further, the orthographic projection of the first sub-portion on the first surface coincides with the first surface.

Based on any one of the foregoing plurality of implementations, the side surface includes a first side surface and a second side surface, and the second side surface and the first side surface are arranged on the circumferential direction of the first surface and connected to each other; and tabs of the first bare cell portion are arranged on the first side surface, the second bare cell portion includes a second sub-portion, the second sub-portion is located on a side that the second side surface faces towards, and an orthographic projection of the second sub-portion on the second side surface overlaps the second side surface.

Further, the orthographic projection of the second sub-portion on the second side surface coincides with the second side surface.

In a possible implementation of the first aspect, the side surface further includes a third side surface, and the third side surface is opposite to the second side surface; and the second bare cell portion further includes a third sub-portion, the third sub-portion is located on a side that the third side surface faces towards, and an orthographic projection of the third sub-portion on the third side surface overlaps the third side surface.

Further, the orthographic projection of the third sub-portion on the third side surface coincides with the third side surface.

On the basis of any one of the above plurality of implementations, the side surface further includes a fourth side surface, and the fourth side surface is opposite to the first side surface; and the second bare cell portion further includes a fourth sub-portion, the fourth sub-portion is located on a side that the fourth side surface faces towards, and an orthographic projection of the fourth sub-portion on the fourth side surface overlaps the fourth side surface.

Further, the orthographic projection of the fourth sub-portion on the fourth side surface coincides with the fourth side surface.

In a possible implementation of the first aspect, the side surface includes a first side surface and a fourth side surface, and the first side surface is opposite to the fourth side surface; and tabs of the first bare cell portion are arranged on the first side face, the second bare cell portion further includes a fourth sub-portion, the fourth sub-portion is located on a side that the fourth side surface faces towards, and an orthographic projection of the fourth sub-portion on the fourth side surface overlaps the fourth side surface.

Further, the orthographic projection of the fourth sub-portion on the fourth side surface coincides with the fourth side surface.

In a possible implementation of the first aspect, the first bare cell portion further has a second surface, and the second surface is opposite to the first surface; and the battery further includes: a third bare cell portion, where the third bare cell portion is located on a side that the second surface faces towards, and an orthographic projection of the third bare cell portion on the second surface overlaps the second surface.

Further, the orthographic projection of the third bare cell portion on the second surface coincides with the second surface.

In a possible implementation of the first aspect, a thickness of a positive electrode sheet of the first bare cell portion ranges from 80 μm to 120 μm; and a thickness of the negative electrode sheet of the first bare cell portion ranges from 110 μm to 16 μm. This can avoid the problem that the first bare cell portion is relatively thick and has a relatively large volume due to the excessive thicknesses of the electrode sheets, and can ensure the capacity of the first bare cell portion.

In a possible implementation of the first aspect, a thickness of a positive electrode sheet of the second bare cell portion ranges from 40 μm to 80 μm; and a thickness of the negative electrode sheet of the second bare cell portion ranges from 70 μm to 110 μm. This can ensure the charge speed of the second bare cell portion, and can avoid the problem that structural strength of the second bare cell portion is weak because the electrode sheets are excessively thin.

In a possible implementation of the first aspect, the battery further includes: a housing, where the first bare cell portion and the second bare cell portion are located in the housing.

In a possible implementation of the first aspect, an accommodation cavity is formed in the housing, and the first bare cell portion and the second bare cell portion are both located in the accommodation cavity. This arrangement helps to reduce the volume of the battery.

In a possible implementation of the first aspect, the housing includes a first housing unit and a second housing unit; a first accommodating cavity is formed in the first housing unit, and the first bare cell portion is accommodated in the first accommodating cavity; and the second housing unit is located outside the first housing unit and is fastened relative to the first housing unit, a second accommodating cavity is formed in the second housing unit, and the second bare cell portion is accommodated in the second accommodating cavity.

In a possible implementation of the first aspect, the tabs of the first bare cell portion and tabs of the second bare cell portion penetrate through the housing to extend out of the housing, the tabs of the first bare cell portion form a first charge and discharge port, and the tabs of the second bare cell portion form a second charge and discharge port. The battery further includes a protection board, and the protection board has a first charge and discharge circuit, a second charge and discharge circuit, a third charge and discharge port, and a fourth charge and discharge port. The first charge and discharge circuit is electrically connected to the first bare cell portion through the first charge and discharge port, the third charge and discharge port is located on the first charge and discharge circuit, and the protection board is configured to electrically connect to a power management module, a charge management module, and a charger through the third charge and discharge port, to form a charge and discharge link. The second charge and discharge circuit is electrically connected to the second bare cell portion through the second charge and discharge port, the fourth charge and discharge port is located on the second charge and discharge circuit, and the protection board is configured to electrically connect to the power management module, the charge management module, and the charger through the fourth charge and discharge port, to form another charge and discharge link. In this way, at least two charge and discharge links independent of each other are formed in the battery. When the second bare cell portion is short-circuited due to piercing by an object such as a broken back cover or a screwdriver, the first bare cell portion can be normally used. This avoids that the first bare cell portion and the second bare cell portion are short-circuited at the same time and release excessively high energy at the same time, thereby reducing the possibility of safety problems such as burning and explosion. In addition, when the battery has a specific volume, the battery can be charged and discharged at the same time through the two charge and discharge links, which can increase the charge and discharge speed of the battery. In addition, the at least two charge and discharge links may be used to manage charge and discharge and detect parameters such as a capacity, a quantity of cycle times, and a health state of one of the first bare cell portion and the second bare cell portion, or manage charge and discharge and detect parameters such as capacities, quantities of cycle times, and health states of both the first bare cell portion and the second bare cell portion. The performance and health state of the battery is used to the maximum extent. Besides, one bare cell portion is charged and the other bare cell portion is discharged at the same time.

According to a second aspect, some embodiments of the present application provide an electronic device, including: a housing and a battery. A battery compartment is arranged in the housing, and the battery compartment has an opening. The battery according to any one of the foregoing technical solutions is installed in the battery compartment, a first surface of a first bare cell portion in the battery faces a same direction as that of an opening of the battery compartment, and a side surface of the first bare cell portion faces towards an inner side surface of the battery compartment.

Since the electronic device provided in the embodiments of the present application includes the battery according to any one of the foregoing technical solutions, the electronic device and the battery can solve the same technical problem and achieve the same effect.

In a possible implementation of the second aspect, the electronic device further includes: a power management module, where the power management module is electrically connected to the battery, and the power management module is configured to discharge power of the second bare cell portion of the battery to a first preset threshold and then discharge the first bare cell portion. The second bare cell portion discharges preferentially, so that power in the second bare cell portion can be reduced. Even if the second bare cell portion is damaged due to proximity to the opening of the battery compartment and the inner side surface of the battery compartment, the risk of burning is reduced and the safety of the battery is improved because the second bare cell portion has less power.

Specifically, a value interval of the first preset threshold is [0, 80% SOC].

Further, the value interval of the first preset threshold is [0, 70% SOC].

In a possible implementation of the second aspect, the electronic device further includes: a charge management module, where the charge management module is electrically connected to the battery, and the charge management module is configured to charge power of the second bare cell portion of the battery to a second preset threshold and then charge the first bare cell portion of the battery. The charge speed of the second bare cell portion with a relatively thin electrode sheet is faster. When power of the battery is exhausted, the second bare cell portion is charged preferentially, to replenish power of the battery in a timely manner and facilitate usage of a user. In addition, management of the battery is more intelligent.

Specifically, the value interval of the second preset threshold is: [60% SOC, 100% SOC].

DETAILED DESCRIPTION OF ILLUSTRATIVE EMBODIMENTS

In the embodiments of this application, the terms "first", "second", "third" and "fourth" are used merely for the purpose of description, and shall not be construed as indicating or implying relative importance or implying a quantity of indicated technical features. Therefore, features defining "first", "second", "third" and "fourth" may explicitly or implicitly include one or more such features.

In the embodiments of this application, the terms "include", "comprise", or any other variants thereof are intended to cover a non-exclusive inclusion. In this way, a process, method, object, or apparatus that includes a series of elements not only includes such elements, but also includes other elements not specified expressly, or further includes inherent elements of the process, method, object, or apparatus. Without more limitations, elements defined by the sentence "including one" does not exclude that there are still other same elements in the process, method, object, or apparatus which includes the element.

This application provides an electronic device. Specifically, the electronic device in implementations of the present application may be any device including a battery 40. The electronic device includes, but is not limited to, a mobile phone, a tablet personal computer (tablet personal computer), a laptop computer (laptop computer), a personal digital assistant (personal digital assistant, PDA), a personal computer, a notebook computer, an in-vehicle device, a wearable device, and the like.

In the embodiments of this application, the term "and/or" describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
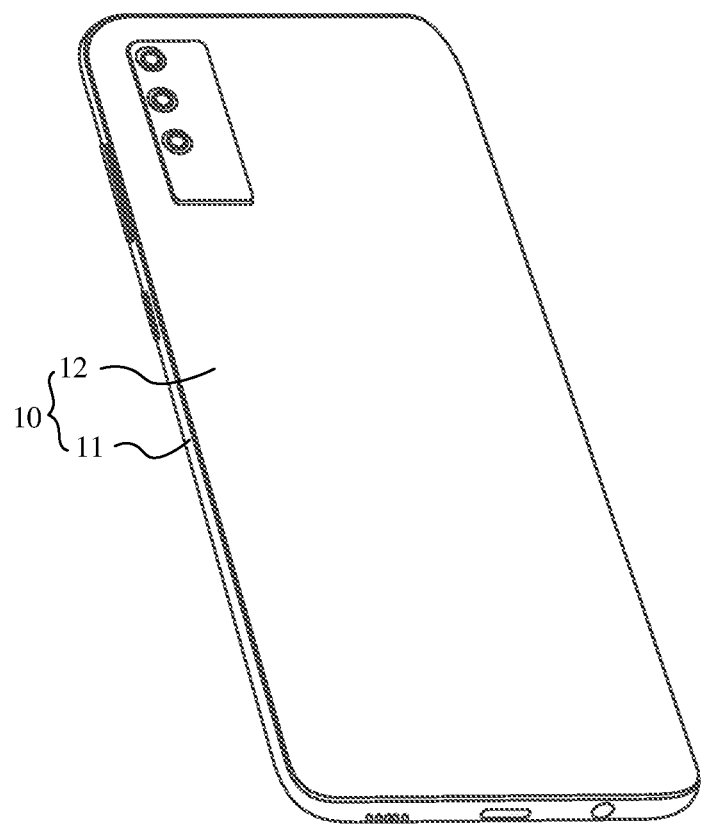
FIG. 1 is a perspective view of an electronic device according to some embodiments of the present application.
Figure 2:
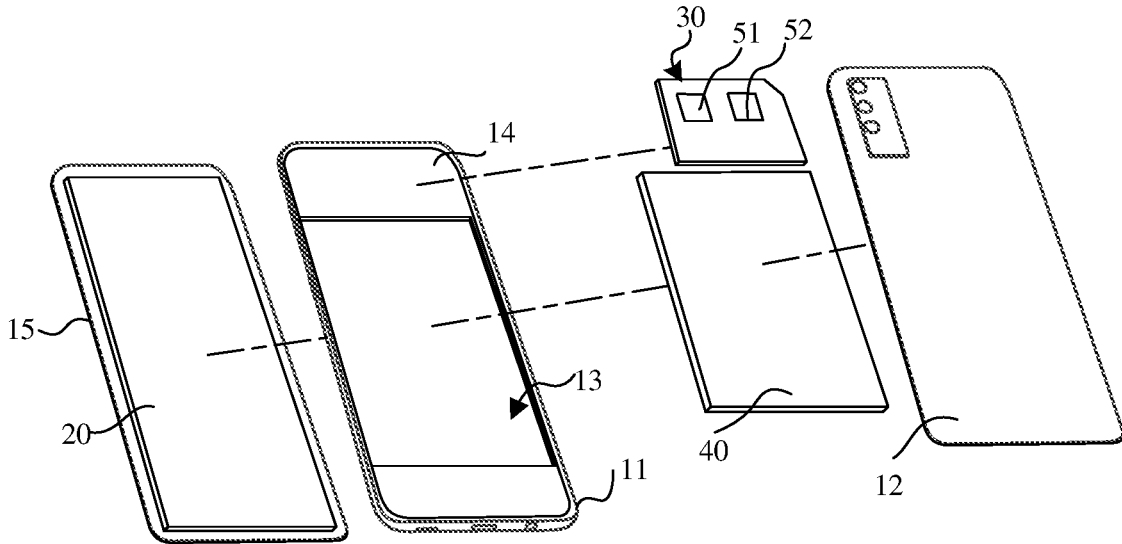
FIG. 2 is an exploded view of the electronic device shown in FIG. 1.

FIG. 1 is a perspective view of an electronic device according to some embodiments of the present application. FIG. 2 is an exploded view of the electronic device shown in FIG. 1. The electronic device may include: a housing 10, a powered device 20, a circuit board 30, a charge management module 51, a power management module 52, and a battery 40.

The powered device 20 is configured to perform one or more functions of the electronic device. The powered device 20 includes, but is not limited to, a processor, a camera module, and a display screen.

Still referring to FIG. 2, the housing 10 is a structure obtained by combining a front cover plate 15, a middle plate 14, a frame 11, and a rear cover 12.

Specifically, the front cover plate 15 is a light-transmitting member, the powered device 20 includes a display screen, and the display screen is configured to display an image, a video, and the like. The front cover plate 15 and the display screen are stacked and fixedly connected to each other. The front cover plate 15 is mainly configured to protect the display screen and prevent dust from falling on the display screen.

A material of the front cover plate 15 includes, but is not limited to, glass, plastic, or ceramic. The display screen can be a flexible display screen or a rigid display screen. For example, the display screen may be an organic light-emitting diode (OLED) display screen, an active matrix-organic light-emitting diode (AMOLED) display screen, a mini organic light-emitting diode display screen, a micro light-emitting diode display screen, a micro organic light-emitting diode display screen, a quantum dot light-emitting diode (QLED) display screen, or a liquid crystal display (LCD).

The middle plate 14 is located on a side that is of the display screen and that is away from the front cover plate 15. The rear cover 12 is provided on a side that is of the middle plate 14 and that is away from the display screen. The frame 11 is located between the rear cover 12 and the front cover plate 15 and surrounds the outer circumference of the middle plate 14. Exemplarily, the frame 11 may be fixedly connected to the rear cover 12 by gluing or welding. The frame 11 and the rear cover 12 can also be formed into an integral structure, that is, the frame 11 and the rear cover 12 are an integral structure. The frame 11 can also be fastened on the middle plate 14 by gluing or welding. Alternatively, the frame 11 and the middle plate 14 may also be formed into an integral structure, that is, the frame 11 and the middle plate 14 are an integral structure.

Specifically, a battery compartment 13 is provided in the housing 10. The battery compartment 13 has an opening. Exemplarily, the middle plate 14 and the frame 11 may be combined to define the battery compartment 13 with an opening. The opening of the battery compartment 13 is disposed adjacent to the rear cover 12, and the opening of the battery compartment 13 can be covered by the rear cover 12. Alternatively, a side surface that is of the middle plate 14 and that is away from the display screen may be recessed towards a side surface that is of the middle plate 14 and that is close to the display screen, to form the battery compartment 13. The opening of the battery compartment 13 is disposed adjacent to the rear cover 12, and the opening of the battery compartment 13 can be covered by the rear cover 12.

The circuit board 30 is disposed on the housing 10 and is located on a side of the circumferential direction of the battery compartment 13. Specifically, the circuit board 30 is located between the middle plate 14 and the rear cover 12, and the circuit board 30 is located on the upper side of the battery compartment 13.

The power management module 52 may be provided on the circuit board 30. The power management module 52 is electrically connected to the battery 40. The power management module 52 is configured to receive an input of the battery 40 and discharge to supply power to the powered device 20. The power management module 52 can also be configured to monitor parameters such as a capacity of the battery 40, a quantity of cycles of the battery 40, and a health status of the battery 40 (power leakage and impedance).

The charge management module 51 may be provided on the circuit board 30. The charge management module 51 is electrically connected to the battery 40. Specifically, as shown in FIG. 2, the charge management module 51 is configured to receive a charge input from the charger. The charger can be a wireless charger or a wired charger. In some embodiments of wired charge, the charge management module 51 may receive a charge input of the wired charger through the USB interface. In some embodiments of wireless charge, the charge management module 51 may receive a wireless charge input through a wireless charge coil of the electronic device. In some embodiments, the power management module 52 and the charge management module 51 may be integrated into one body, or may be provided separately.

The battery 40 is disposed in the battery compartment 13, and the battery 40 is electrically connected to the circuit board 30. The battery 40 may include, but is not limited to, a nickel-cadmium battery, a nickel-metal hydride battery, a lithium battery, or other types of batteries that include bare cells. In addition, there may be one or more batteries 40 in the embodiments of the present application, and a specific quantity and arrangement of the batteries 40 in the embodiments of the present application may be set according to actual needs. In the following description, for example, the battery 40 is a lithium battery.

Figure 3:
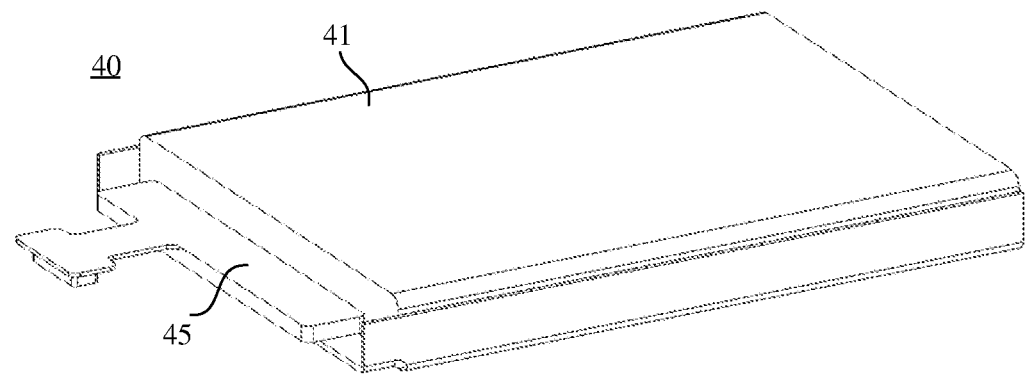
FIG. 3 is a perspective view of a battery according to some embodiments of the present application.
Figure 4:
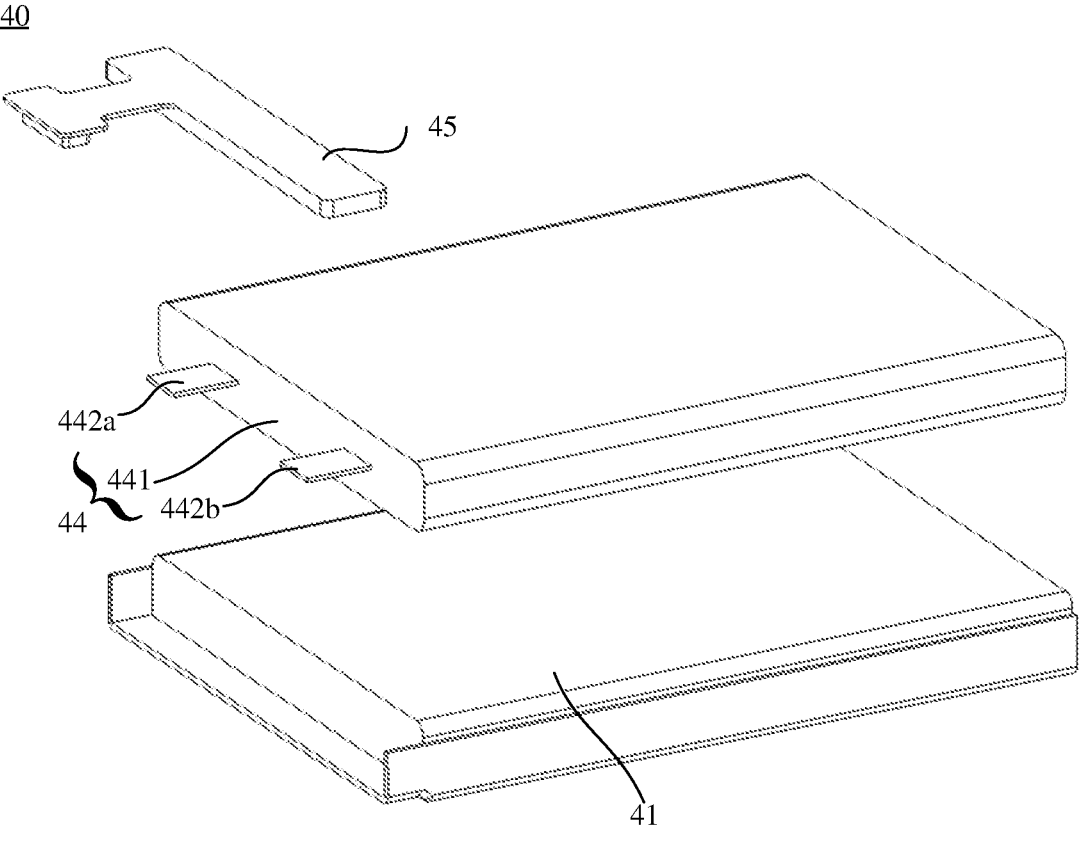
FIG. 4 is an exploded view of the battery shown in FIG. 3.

FIG. 3 is a perspective view of the battery 40 according to some embodiments of the present application. FIG. 4 is an exploded view of the battery 40 shown in FIG. 3. Specifically, the battery 40 includes a housing 41, an electrolyte (not shown in the figure), a bare cell 44, and a protection board 45.

The housing 41 is configured to seal and protect the bare cell 44 and the electrolyte, and a shape of the housing 41 includes, but is not limited to, a cuboid, a cylinder, a cone, and the like.

A material of the housing 41 may be a steel shell or a composite membrane. In the example shown in FIG. 4, the material of the housing 41 is a composite membrane. Specifically, the composite membrane is divided into at least three layers. A middle layer is a metal coating layer and functions to isolate moisture, an outer layer is a plastic coating layer and functions to prevent the permeation of air, especially oxygen, and an inner layer is a sealing layer and functions to seal and prevent the electrolyte from corroding the metal coating layer. A material of the sealing layer is selected from at least one of polyethylene, polypropylene, polyethylene or polypropylene esters, or polyethylene or polypropylene ionomers, polyethylene is selected from low-density polyethylene, medium-density polyethylene, or high-density polyethylene, and polypropylene is selected from homopolypropylene, block polypropylene, or random polypropylene. A material of the metal coating layer is selected from at least one of a metal, a metal alloy, a metal oxide, or a ceramic, and the metal is selected from aluminum, iron, silver, copper, nickel, manganese, tin, titanium, zirconium, or vanadium. A material of the plastic coating layer is selected from at least one of polyamide resin, polyolefin, polycarbonate, or fluororesin. The composite membrane can be specifically an aluminum-plastic membrane. A middle layer of the aluminum-plastic membrane is an aluminum layer and functions to isolate moisture, an outer layer of the aluminum-plastic membrane is polyamide and functions to prevent the penetration of air, especially oxygen, and an inner layer of the aluminum-plastic membrane is a polypropylene layer and functions to seal and prevent the electrolyte from corroding the aluminum layer.

The electrolyte is a carrier for transporting lithium ions in the battery 40, and the electrolyte is generally prepared from raw materials such as high-purity organic solvents, electrolyte lithium salts, and necessary additives at specific proportions under certain conditions.

The protection board 45 can be an integrated circuit board that protects the battery 40, for example, the protection board 45 is a BTB connector, and the protection board 45 is configured to implement electrical connection between the battery 40 and the circuit board 30.

Still referring to FIG. 4, the bare cell 44 includes a bare cell body 441 and tabs. Specifically, the tabs are connected to the bare cell body 441, and include a first tab 442a and a second tab 442b. One of the first tab 442a and the second tab 442b is a positive tab and the other is a negative tab. The bare cell body 441 is located in the housing 41, and the two tabs penetrate through the housing 41 and are connected to the protection board 45.

Generally, as functions of electronic devices become more and more powerful, to meet electricity quantity requirements of electronic devices, capacities of batteries required in electronic devices increase. However, a battery with a large capacity has a higher risk of an internal short-circuit and burning. For example, the battery has an internal short-circuit because of external force abuse, for example, a broken back cover pierces into the battery due to external impact in daily life, or a screwdriver pierces into the battery in repair of the electronic device.

In the prior art, to improve battery safety, the current improvement solutions focus on optimizing materials such as an electrode sheet, an electrolyte, and a separator. For example, a functional coating is added to the aluminum foil of the positive electrode sheet or the strength of the separator is improved, to avoid that the battery catches fire and burns due to the most dangerous short circuit between the aluminum foil and the negative electrode sheet or the copper foil. Another example is to reduce a closed-hole temperature of the separator, or add a heat-resistant coating to the separator to prevent heat from spreading further inside the battery and causing thermal runaway. Although these measures are effective, the energy density of the battery is reduced, and the charge and discharge speeds are also reduced.

Figure 5:
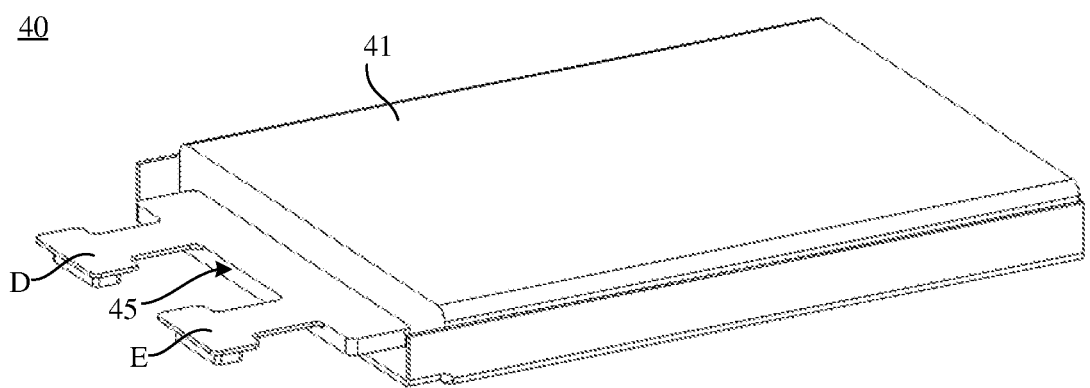
FIG. 5 is a perspective view of a battery according to other embodiments of the present application.
Figure 6:
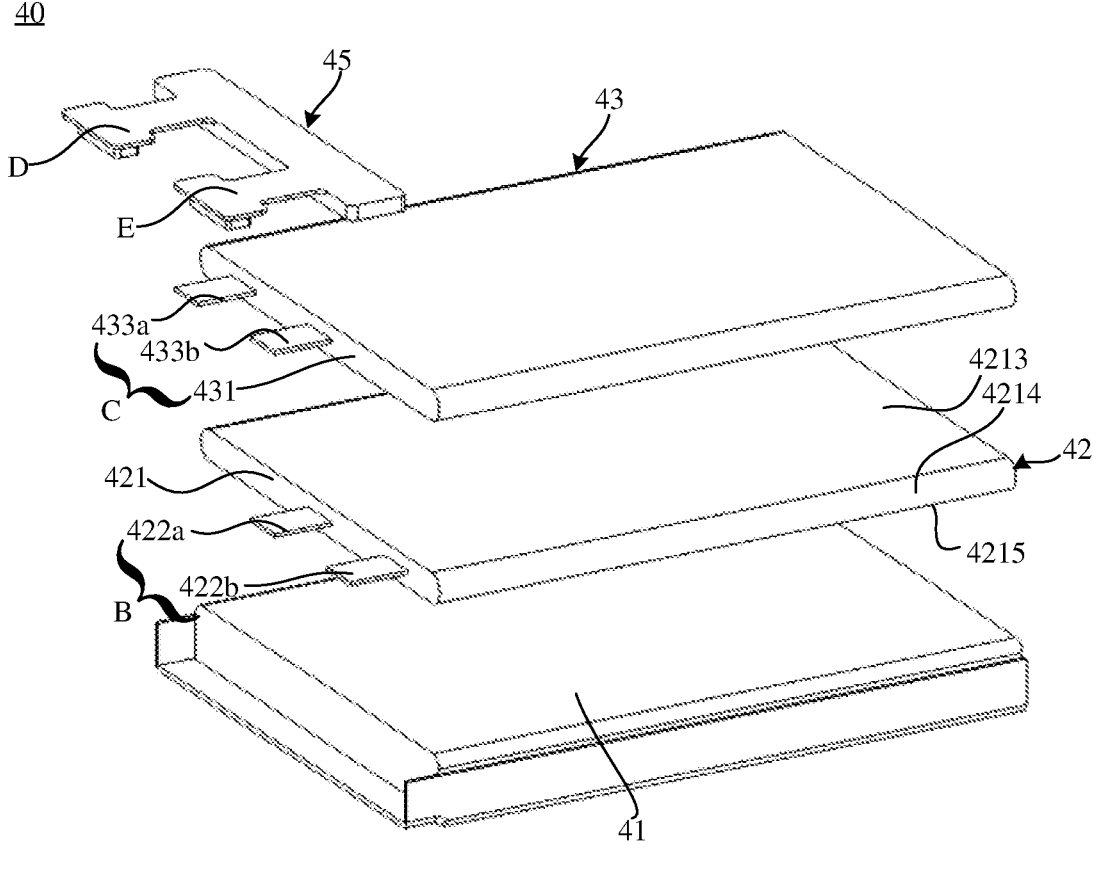
FIG. 6 is an exploded view of the battery shown in FIG. 5.

Therefore, to improve the safety of the battery 40, the present application improves the battery 40 from the perspective of dividing the capacity of the cell. Specifically, refer to FIG. 5 and FIG. 6. FIG. 5 is a perspective view of a battery 40 according to some other embodiments of the present application. FIG. 6 is an exploded view of the battery 40 shown in FIG. 5. In this embodiment, the battery 40 includes a first bare cell portion 42 and a second bare cell portion 43.

The first bare cell portion 42 and the second bare cell portion 43 are located in the housing 41. A material of the housing 41 may be the same as that of the housing 41 in the above embodiment.

Still referring to FIG. 6, the first bare cell portion 42 includes a first bare cell portion body 421 and tabs.

A shape of the first bare cell portion body 421 may include, but is not limited to, a cuboid, a cylinder, or a cone.

Figure 7A:
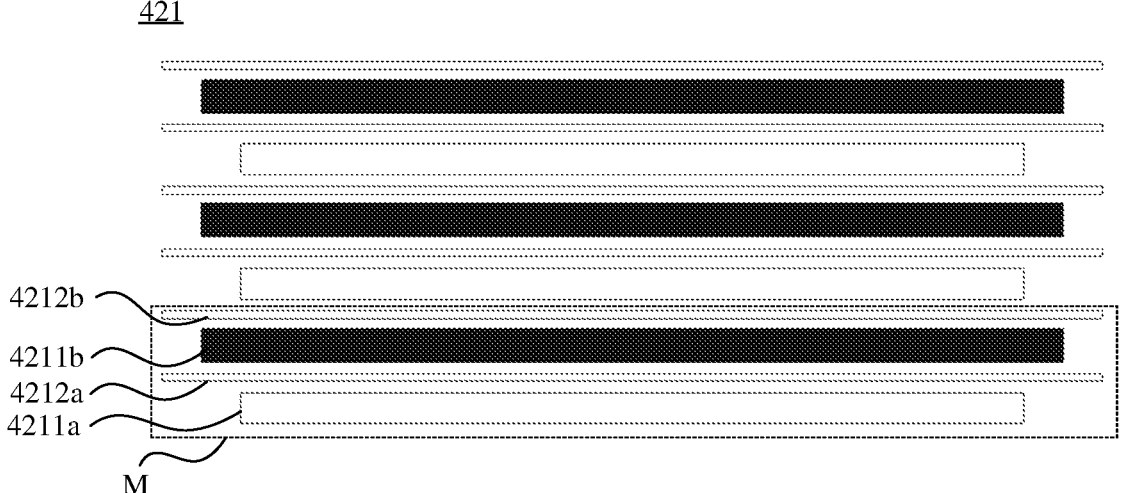
FIG. 7A is a schematic diagram of a diaphragm of a first bare cell portion according to some embodiments of the present application.

In some embodiments, the first bare cell portion body 421 may be wound. FIG. 7a is a schematic cross-sectional structural diagram of the first bare cell portion body 421 of the battery 40 shown in FIG. 6. In this embodiment, the first bare cell portion body 421 is a wound bare cell portion. The first bare cell portion body 421 is formed by winding a diaphragm M. Specifically, the diaphragm M includes a first electrode sheet 4211a, a first separator 4212a, a second electrode sheet 4211b, and a second separator 4212b that are stacked in sequence. One of the first electrode sheet 4211a and the second electrode sheet 4211b is a positive electrode sheet and the other is a negative electrode sheet. The separator arranged between the two adjacent electrode sheets can separate the positive electrode sheet from the negative electrode sheet, and functions to insulate and isolate to prevent a short circuit between the two electrodes.

The electrode sheet includes a current collecting piece and an electrode material arranged on a surface of the current collecting piece, the electrode material is a material that participates in charge and discharge reaction, and the current collecting piece is configured to collect currents. For the positive electrode sheet, a material of the current collector piece is aluminum (chemical formula: Al). For the negative electrode sheet, a material of the current collecting piece is copper (chemical formula: Cu).

In addition, a material of the separator is a polyolefin porous membrane. Along an extending direction of the winding axis of the diaphragm, two ends of the separator extend beyond the edged of two ends of the electrode sheet, to insulate and protect the edges of the two ends of the electrode sheet along the extending direction of the winding axis of the diaphragm.

In some other embodiments, the first bare cell portion body 421 may also be a laminate. Specifically, the first bare cell portion body 421 is formed by alternately stacking the first electrode sheet and the second electrode sheet, and the separator is provided between the adjacent first electrode sheet and second electrode sheet. One of the first electrode sheet and the second electrode sheet is a positive electrode sheet and the other is a negative electrode sheet. The first electrode sheet and the second electrode sheet in this embodiment may have the same structures as those in the above wound first bare cell portion body 421. The separator functions to insulate and isolate. The separator can be a separator bag, a separator folded in a zigzag shape, or a plurality of single-piece separators. This application does not limit a specific structural form of the separator in the laminated bare cell portion, as long as the first electrode sheet and the second electrode sheet can be insulated and isolated. A material of the separator may also be a polyolefin porous membrane.

It should be noted that, for the convenience of the following description, the following description uses only an example in which the first bare cell portion body 421 is a wound bare cell portion. This should not be regarded as special limitation on the present application.

Still referring to FIG. 6, specifically, the tabs of the first bare cell portion 42 include a first tab 422a and a second tab 422b. One of the first tab 422a and the second tab 422b is a positive tab and the other is a negative tab. The first tab 422a and the second tab 422b penetrate through the housing 41 to connect to the protection board 45. The first tab 422a and the second tab 422b form a first charge and discharge port B.

Specifically, one end of the first tab 422a is electrically connected to the first electrode sheet 4211a, and the other end of the first tab 422a extends out of the housing 41 to connect to the protection board 45. One end of the second tab 422b is electrically connected to the second electrode sheet 4211b, and the other end of the second tab 422b passes out of the housing 41 to connect to the protection board 45.

The first tab 422a may be connected to the current collecting piece of the first electrode sheet 4211a by welding, pressing, or the like, or may be directly formed by extending the current collecting piece of the first electrode sheet 4211a.

Figure 7B:
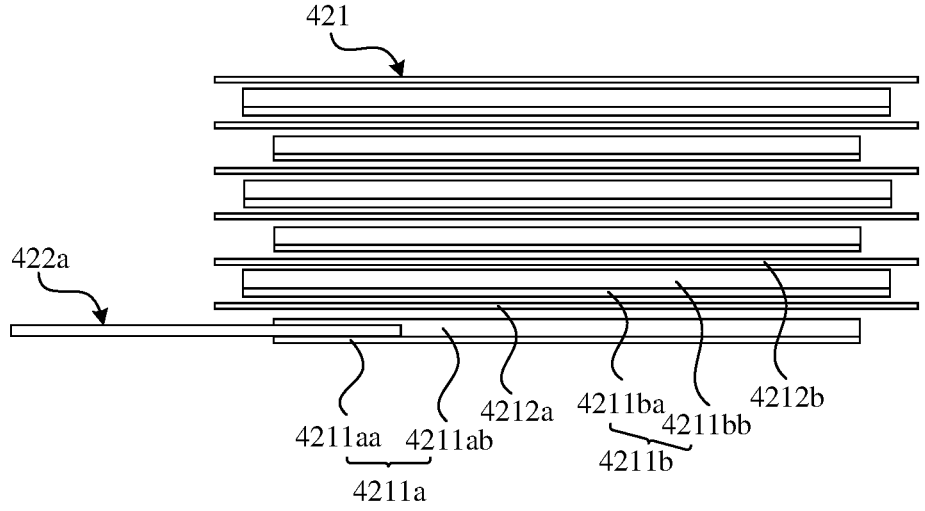
FIG. 7B is a schematic structural diagram of a connection between a first bare cell portion body shown in FIG. 7a and a first tab.

For example, FIG. 7b is a schematic diagram of a connection structure of the first bare cell portion body 421 and the first tab 422a shown in FIG. 7a. In this embodiment, the first electrode sheet 4211a includes a current collecting piece 4211aa and an electrode material 4211ab disposed on the current collecting piece 4211aa. The first tab 422a is connected to the current collecting piece 4211aa of the first electrode sheet 4211a by welding, pressing, or the like.

Figure 7C:
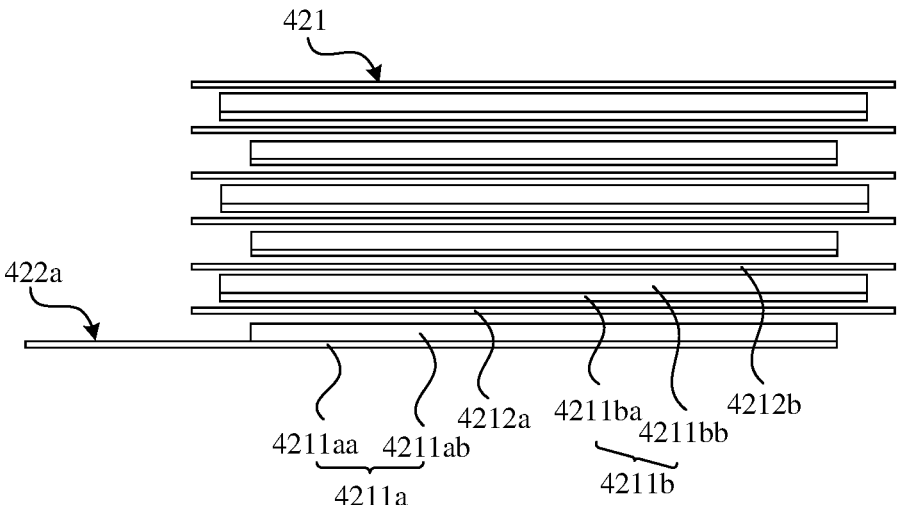
FIG. 7C is a schematic structural diagram of another connection between a first bare cell portion body shown in FIG. 7a and a first tab.

For another example, FIG. 7c is a schematic diagram of another connection structure of the first bare cell portion body 421 and the first tab 422a shown in FIG. 7a. In this embodiment, the first electrode sheet 4211a includes a current collecting piece 4211aa and an electrode material 4211ab disposed on the current collecting piece 4211aa. The first tab 422a is directly formed by extending the current collecting piece 4211aa of the first electrode sheet 4211a.

Similarly, referring to FIG. 7b and FIG. 7c, the second electrode sheet 4211b includes a current collecting piece 4211ba and an electrode material 4211bb disposed on the current collecting piece 4211ba. The second tab 422b may be connected to the current collecting piece 4211ba of the second electrode sheet 4211b by welding, pressing, or the like, or may be directly formed by extending the current collecting piece 4211ba of the second electrode sheet 4211b. Specifically, for a manner of the connection between the second tab 422b and the current collecting piece 4211ba of the second electrode sheet 4211b, refer to the manner of the connection between the first tab 422a and the current collecting piece 4211aa of the first electrode sheet 4211a shown in FIG. 7b or FIG. 7c. This is not repeated herein.

It should be noted that FIG. 7b and FIG. 7c only show an example in which the first tab 422a is a single tab unit, and a structure of the first tab 422a is not limited thereto. In some other embodiments, the first tab 422a may also be formed by fastening a plurality of tab units by welding, pressing, or the like. The plurality of tab units are disposed on the current collecting piece 4211aa of the first electrode sheet 4211a at intervals. When the first electrode sheet 4211a is wound with the first separator 422a, the second electrode sheet 4211b, and the second separator 4212b to form a bare cell, the plurality of tab units are stacked to facilitate fastening. The plurality of tab units can be fastened on the current collecting piece 4211aa of the first electrode sheet 4211a by welding, pressing, or the like, or can be directly formed by extending the current collecting piece 4211aa. This is not specifically limited herein.

Figure 7D:
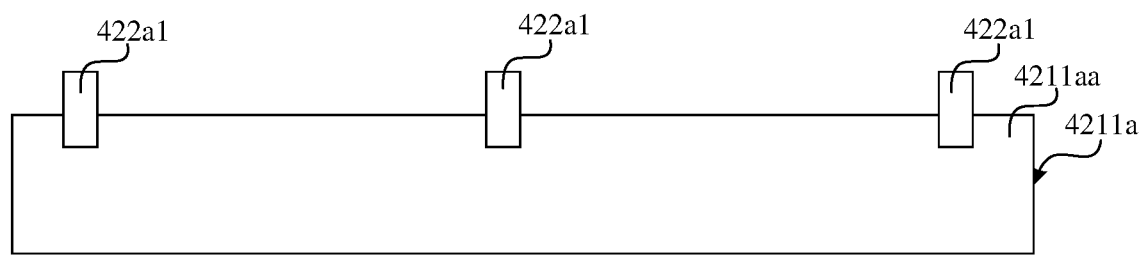
FIG. 7D is a schematic structural diagram of a connection between a first electrode sheet in a first bare cell portion body shown in FIG. 7a in an unfolded state and a first tab.
Figure 7E:
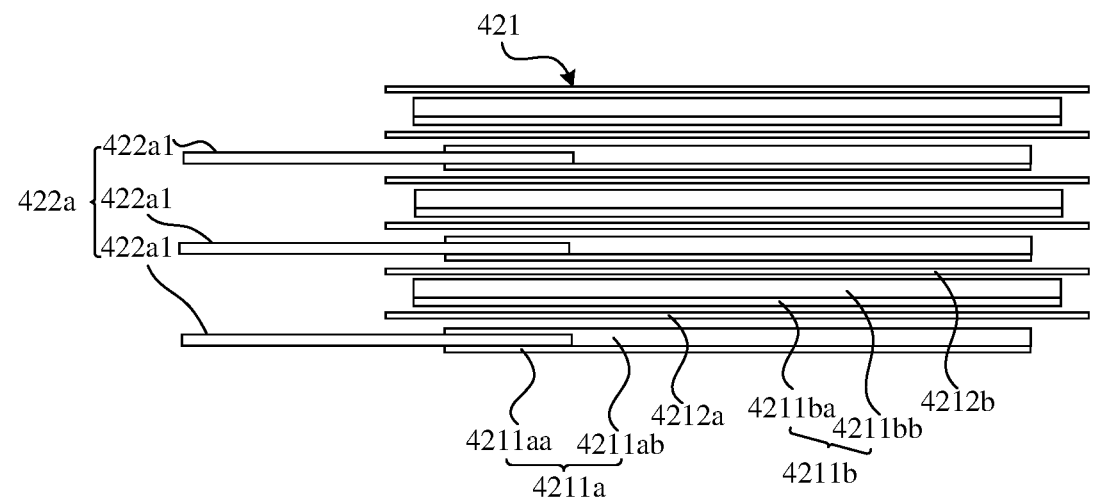
FIG. 7E is a schematic structural diagram in which the first electrode sheet shown in FIG. 7d is wound with a first separator, a second electrode sheet, and a second separator to form a bare cell.

For example, FIG. 7d is a schematic diagram of a connection structure of the first electrode sheet 4211a in an unfolded state and the first tab 422a in the first bare cell portion body 421 shown in FIG. 7a. The first tab 422a includes a plurality of tab units 422a1. The plurality of tab units 422a1 are fastened on the current collecting piece 4211aa of the first electrode sheet 4211a at intervals by welding, pressing, or the like. When the first electrode sheet 4211a is wound with the first separator 4212a, the second electrode sheet 4211b, and the second separator 4212b to form a bare cell, FIG. 7e is a schematic structural diagram in which the first electrode sheet 4211a shown in FIG. 7d is wound with the first separator 4212a, the second electrode sheet 4211b, and the second separator 4212b to form a bare cell. In this embodiment, a plurality of tab units 422a1 are stacked to be fastened together by welding, pressing, or the like, to form the first tab 422a.

Figure 7F:
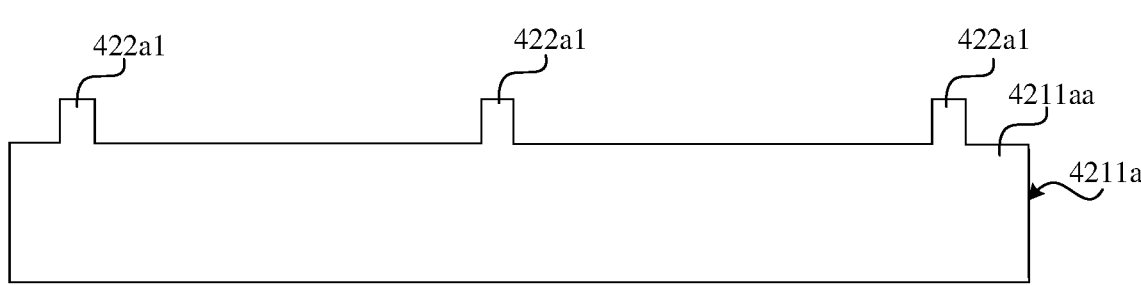
FIG. 7F is a schematic structural diagram of another connection between a first electrode sheet in a first bare cell portion body shown in FIG. 7a in an unfolded state and a first tab.
Figure 7G:
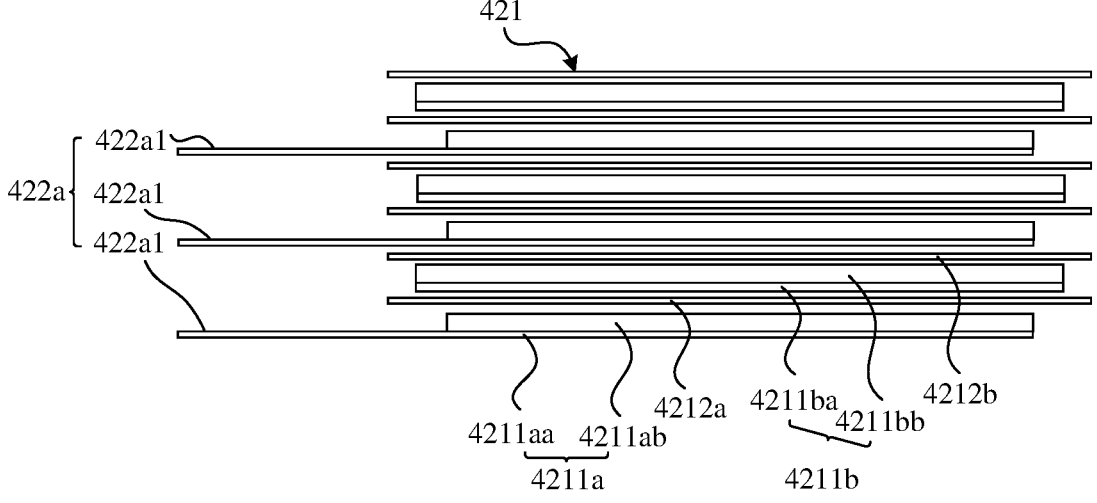
FIG. 7G is a schematic structural diagram in which the first electrode sheet shown in FIG. 7f is wound with a first separator, a second electrode sheet, and a second separator to form a bare cell.

For another example, FIG. 7f is a schematic diagram of another connection structure of the first electrode sheet 4211a in an unfolded state and the first tab 422a in the first bare cell portion body 421 shown in FIG. 7a. The first tab 422a includes a plurality of tab units 422a1. The plurality of tab units 422a1 are directly formed by extending the current collecting piece 4211aa of the first electrode sheet 4211a. When the first electrode sheet 4211a is wound with the first separator 4212a, the second electrode sheet 4211b, and the second separator 4212b to form a bare cell, FIG. 7g is a schematic structural diagram in which the first electrode sheet 4211a shown in FIG. 7f is wound with the first separator 4212a, the second electrode sheet 4211b, and the second separator 4212b to form a bare cell. In this embodiment, a plurality of tab units 422a1 are stacked to be fastened together by welding, pressing, or the like, to form the first tab 422a.

Similarly, the second electrode sheet 4211b includes a current collecting piece 4211ba and an electrode material 4211bb disposed on the current collecting piece 4211ba. The second tab 422b may also be formed by fastening a plurality of tab units by welding, pressing, or the like. The plurality of tab units are disposed on the current collecting piece 4211ba of the second electrode sheet 4211b at intervals. When the second electrode sheet 4211b is wound with the first separator 4212a, the first electrode sheet 4211a, and the second separator 4212b to form a bare cell, the plurality of tab units are stacked to facilitate fastening. The plurality of tab units can be fastened on the current collecting piece 4211ba of the second electrode sheet 4211b by welding, pressing, or the like, or can be directly formed by extending the current collecting piece 4211*ba*. This is not specifically limited herein.

Portions that are of the tabs (including the first tab 422*a* and the second tab 422*b*) of the first bare cell portion 42 in any one of the above embodiments and that penetrate through the housing 41 are wrapped with tab glue, and the tab glue functions to insulate and isolate, so as to prevent the tabs from contacting with a conductive layer such as metal in the housing 41.

Specifically, the tab glue is formed by winding a single-sided tape, and the single-sided tape includes a base material and a glue material disposed on the surface of the base material. A material of the base material includes, but is not limited to, plastics such as polypropylene (PP), polyethylene (PE), polyamide (PA), polycarbonate (PC), polyformalde-hyde (POM), polyethylene glycol terephthalate (PET), poly-butylene terephthalate (PBT), and polyphenylene oxide (PPO). The glue material has a specific viscosity, and the glue material is resistant to chemical solvent corrosion and high temperatures (typically, such as 200° C.). The glue material includes, but is not limited to, one or a combination of the following materials: solvent-based adhesives such as styrene-butadiene rubber, polyurethane, nitrocellulose, and polyvinyl acetate, water-soluble adhesives such as ethylene-vinyl acetate copolymer and ethylene-acrylic acid copoly-mer, emulsion adhesives such as vinyl acetate resins and acrylic resins, and hot melt adhesives including thermoplas-tic resins such as polystyrene, polyurethane, and polyacry-late. A shape of the single-sided tape includes, but is not limited to, a rectangle, a circle, a square, a diamond, a trapezoid, and a hexagon. It can be understood that the tab glue can also be an insulating sleeve formed by insulating materials such as dispensing glue dripped on the tab or rubber and plastic sleeved on the tab.

Still referring to FIG. 6, the first bare cell portion 42 has a first surface 4213, a second surface 4215, and a side surface 4214. The first surface 4213 and the second surface 4215 are disposed opposite to each other. The side surface 4214 is connected between the first surface 4213 and the second surface 4215. When the battery 40 is applied to the electronic device, the first surface 4213 is configured to face towards a same direction as that of an opening of a battery compartment 13 of the electronic device when the battery 40 is installed in the battery compartment 13. That is, the first surface 4213 is closer to the rear cover 12. When the battery 40 is applied to the electronic device, the second surface 4215 is configured to face the bottom surface of the battery compartment 13 of the electronic device when the battery 40 is installed in the battery compartment 13. That is, the second surface 4215 is opposite to the rear cover 12 and faces the bottom of the battery compartment 13. When the battery 40 is applied to the electronic device, the side surface 4214 is configured to face towards an inner side surface of the battery compartment 13 of the electronic device when the battery 40 is installed in the battery compartment 13.

Still referring to FIG. 6, the second bare cell portion 43 includes a second bare cell portion body 431 and tabs.

A shape of the second bare cell portion body 431 may include, but is not limited to, a cuboid, a cylinder, or a cone.

Figure 8:
FIG. 8 is a schematic diagram of a diaphragm of a second bare cell portion according to some embodiments of the present application.

In some embodiments, the second bare cell portion body 431 may be wound. FIG. 8 is a schematic cross-sectional structural diagram of the second bare cell portion body 431 of the battery 40 shown in FIG. 6. In this embodiment, the second bare cell portion body 431 is a wound bare cell portion. The second bare cell portion body 431 is formed by winding a diaphragm N. Specifically, the diaphragm N includes a first electrode sheet 4311*a*, a first separator 4312*a*, a second electrode sheet 4311*b*, and a second separator 4312*b* that are stacked in sequence. One of the first electrode sheet 4311*a* and the second electrode sheet 4311*b* is a positive electrode sheet and the other is a negative electrode sheet. The separator arranged between the two adjacent electrode sheets can separate the positive electrode sheet from the negative electrode sheet, and functions to insulate and isolate to prevent a short circuit between the two electrodes.

A structure and a materials of the electrode sheet of the second bare cell portion body 431 may be the same as those of the electrode sheets of the first bare cell portion body 421, and a material of the separator of the second bare cell portion body 431 may be the same as that of the separator of the first bare cell portion body 421.

In some other embodiments, the second bare cell portion body 431 may also be a laminate. Specifically, the second bare cell portion body 431 is formed by alternately stacking the first electrode sheet and the second electrode sheet, and the separator is provided between the adjacent first electrode sheet and second electrode sheet. One of the first electrode sheet and the second electrode sheet is a positive electrode sheet and the other is a negative electrode sheet. The first electrode sheet and the second electrode sheet of the lami-nated second bare cell portion 43 may have the same structures and materials as those in the above wound second bare cell portion body 431. In this embodiment, the sepa-rator can be a separator bag, a separator folded in a zigzag shape, or a plurality of single-piece separators. This appli-cation does not limit a specific structural form of the separator in the laminated bare cell portion, as long as the first electrode sheet and the second electrode sheet can be insulated and isolated. A material of the separator may also be a polyolefin porous membrane.

It should be noted that the second bare cell portion 43 and the first bare cell portion 42 may be independent of each other and physically separated, that is, the second bare cell portion 43 and the first bare cell portion 42 are independent bare cells. Certainly, the present application is not limited thereto. In some other embodiments, the separator of the second bare cell portion 43 is integrally connected to the separator of the first bare cell portion 42. In this embodi-ment, the second bare cell portion 43 is integrally connected to the first bare cell portion 42.

Still referring to FIG. 6, the tabs of the second bare cell portion 43 include a first tab 433*a* and a second tab 433*b*. One of the first tab 433*a* and the second tab 433*b* is a positive tab and the other is a negative tab. The first tab 433*a* and the second tab 433*b* penetrate through the housing 41 to connect to the protection board 45. The first tab 433*a* and the second tab 433*b* form a second charge and discharge port C.

Specifically, one end of the first tab 433*a* is electrically connected to the first electrode sheet 4311*a*, and the other end of the first tab 433*a* extends out of the housing 41 to connect to the protection board 45. One end of the second tab 433*b* is electrically connected to the second electrode sheet 4311*b*, and the other end of the second tab 433*b* extends out of the housing 41 to connect to the protection board 45.

Exemplarily, one end of the first tab 433*a* is connected to a current collecting piece of the first electrode sheet 4311*a*, and one end of the second tab 433*b* is connected to a current collecting piece of the second electrode sheet 4311*b*. Spe-cifically, the first tab 433*a* and the second tab 433*b* can be connected to the current collecting piece of the first elec-trode sheet 4311*a* and the current collecting piece of the second electrode sheet 4311*b* respectively by welding, pressing, or the like, or may be directly formed by extending the current collecting piece of the first electrode sheet 4311*a* and the current collecting piece of the second electrode sheet 4311*b* respectively. This is not specifically limited herein.

Portions that are of the tabs (including the first tab 433*a* and the second tab 433*b*) of the second bare cell portion 43 in any one of the above embodiments and that penetrate through the housing 41 are wrapped with tab glue, and the tab glue functions to insulate and isolate, so as to prevent the tabs from contacting with a conductive layer such as metal in the housing 41. A material and a shape of the tab glue are the same as those of the tab glue configured to wrap the first bare cell portion 42, and are not repeated herein.

In the present application, the second bare cell portion 43 is configured to resist piercing by objects such as a broken back cover and a screwdriver. Besides, it is avoided that these objects pierce into both the second bare cell portion 43 and the first bare cell portion 42. This avoids that the first bare cell portion 42 and the second bare cell portion 43 are short-circuited at the same time, and consequently a large amount of energy is released at the same time, thereby reducing the possibility of safety problems such as fire and explosion. To achieve this purpose, a position relationship between the first bare cell portion 42 and the second bare cell portion 43 needs to be properly arranged, so that the second bare cell portion 43 can be configured to protect the first bare cell portion 42, to reduce the possibility that the first bare cell portion 42 and the second bare cell portion 43 are pierced into at the same time and a short circuit is caused. Specifically, the position relationship between the first bare cell portion 42 and the second bare cell portion 43 may include the following example 1 to example 3.

Example 1

This example provides improvement in that the second bare cell portion 43 protects the first bare cell portion 42 only from the side of the first surface 4213.

Figure 9:
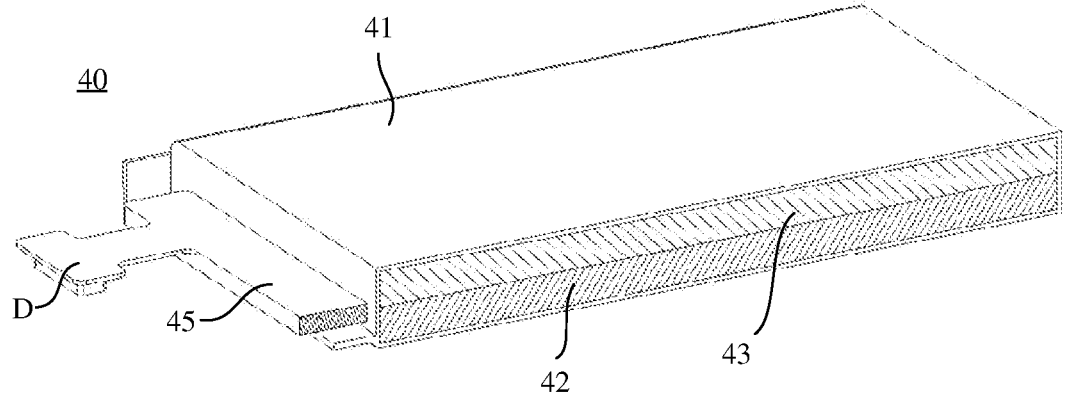
FIG. 9 is a perspective cross-sectional view of the battery shown in FIG. 5.
Figure 10:
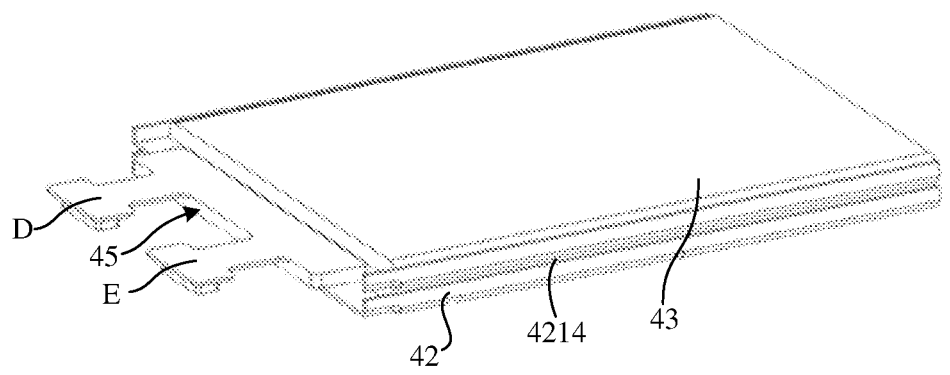
FIG. 10 is a schematic structural diagram of a part of the battery shown in FIG. 5, where a housing is not shown in FIG. 10.

Still refer to FIG. 6 with reference to FIG. 9 and FIG. 10. FIG. 9 is a perspective cross-sectional view of the battery shown in FIG. 5. FIG. 10 is a schematic structural diagram of a part of the battery shown in FIG. 5, where a housing is not shown in FIG. 10. In this example, the second bare cell portion 43 is located on a side that the first surface faces towards, and an orthographic projection of the second bare cell portion 43 on the first surface 4213 overlaps the first surface 4213. That is, a part of the orthographic projection of the second bare cell portion 43 on the first surface 4213 coincides with a part of the first surface 4213; a part of the orthographic projection of the second bare cell portion 43 on the first surface 4213 coincides with the first surface 4213; the entire orthographic projection of the second bare cell portion 43 on the first surface 4213 coincides with a part of the first surface 4213; or the orthographic projection of the second bare cell portion 43 on the first surface 4213 completely coincides with the first surface 4213, that is, the outer circumference of the surface that is of the second bare cell portion 43 and that faces the first surface 4213 is flush with the outer circumference of the first surface 4213. In this way, the second bare cell portion 43 can be configured to protect the first bare cell portion 43 from the side of the first surface 4213, thereby improving the safety of the battery 40.

Still referring to FIG. 9 and FIG. 10, in this example, an accommodating cavity is formed in the housing 41, and the first bare cell portion 42 and the second bare cell portion 43 can be located in the accommodating cavity of the housing

Figure 11:
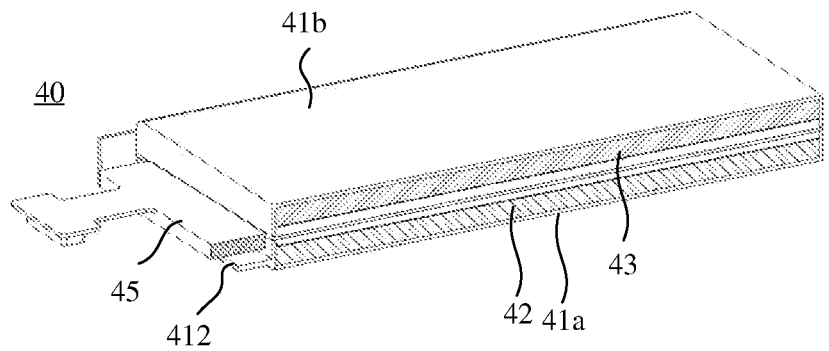
FIG. 11 is a perspective cross-sectional view of a battery according to some other embodiments of the present application.

41, that is, the first bare cell portion 42 and the second bare cell portion 43 share the accommodating cavity, which helps to improve the space utilization of the battery 40. Certainly, the example is not limited thereto. FIG. 11 is a perspective cross-sectional view of a battery according to some other embodiments of the present application. In the example shown in FIG. 11, the first bare cell portion 42 and the second bare cell portion 43 are located in different accommodating cavities of the housing 41.

Specifically, still referring to FIG. 11, the housing 41 includes a first housing unit 41*a* and a second housing unit 41*b*.

Materials of the first housing unit 41*a* and the second housing unit 41*b* may be the same as that of the housing 41 described above. A shape of the first housing unit 41*a* includes, but is not limited to, a cuboid, a cylinder, or a cone, and a shape of the second housing unit 41*b* includes, but is not limited to, a cuboid, a cylinder, or a cone.

The second housing unit 41*b* and the first housing unit 41*a* are stacked, and the second housing unit 41*b* is located on a side that is of the first housing unit 41*a* and that faces the opening of the battery compartment 13, and is fastened relative to the first housing unit 41*a*. For example, the second housing unit 41*b* is fastened to the first housing unit 41*a* by means of gluing, clamping, screwing, welding, or the like.

A first accommodating cavity is formed in the first housing unit 41*a*, and a second accommodating cavity is formed in the second housing unit 41*b*. The first bare cell portion 42 is accommodated in the first accommodating cavity, and a shape of the first bare cell portion 42 can be adapted to that of the first housing unit 41*a*. The second bare cell portion 43 is accommodated in the second accommodating cavity, and a shape of the second bare cell portion 43 can be adapted to that of the second housing unit 41*b*. In this way, the first bare cell portion 42 and the second bare cell portion 43 can be independent of each other, thereby improving the safety of the first bare cell portion 42 and the second bare cell portion 43 in operation.

Example 2

This example provides improvement in that the second bare cell portion 43 protects the first bare cell portion 42 from the side of the first surface 4213 and the side of the side surface 4214. In this implementation, the second bare cell portion 43 may protect any one side surface 4214, any several side surfaces 4214, or all side surfaces 4214 of the plurality of side surfaces 4214 that are of the first bare cell portion 42 and that are arranged along the circumferential direction of the first surface 4213.

Figure 12:
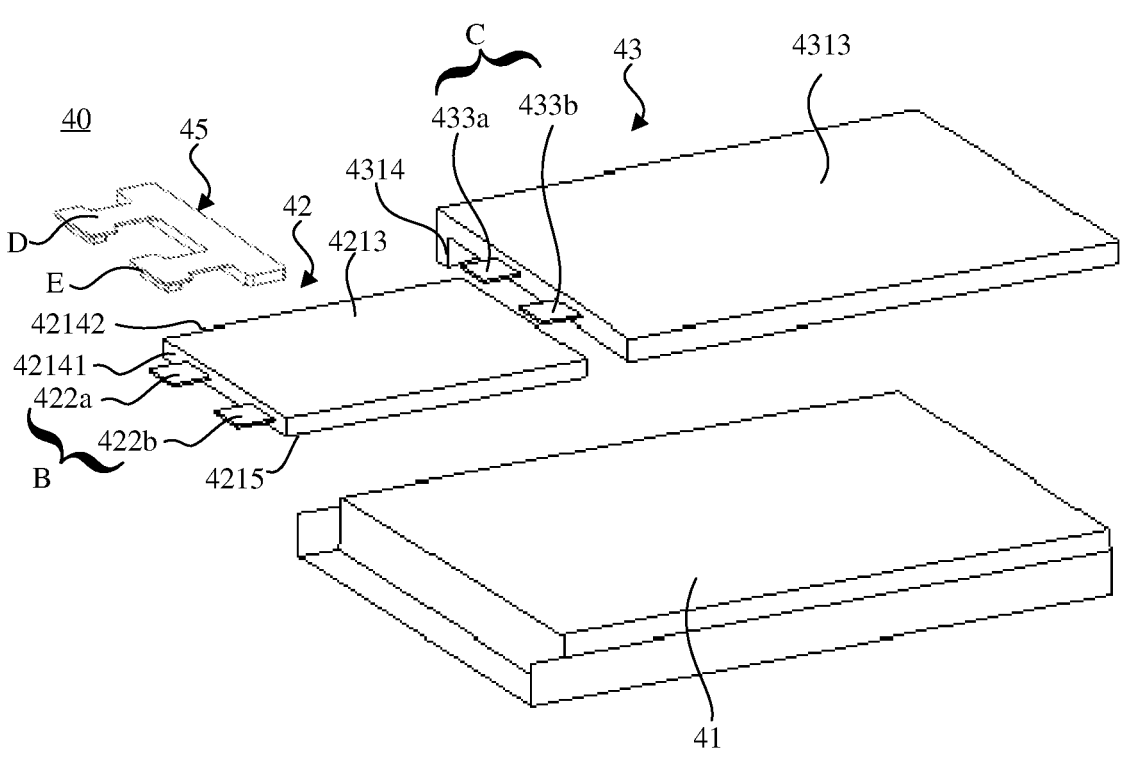
FIG. 12 is an exploded view of a battery according to some other embodiments of the present application.

In some specific examples of this example, FIG. 12 is an exploded view of a battery according to some other embodiments of the present application. In this example, the second bare cell portion 43 includes a first sub-portion 4313 and a second sub-portion 4314.

The first sub-portion 4313 is located on the side that the first surface 4213 faces towards, and an orthographic projection of the first sub-portion 4313 on the first surface 4213 overlaps the first surface 4213. That is, a part of the orthographic projection of the first sub-portion 4313 on the first surface 4213 coincides with a part of the first surface 4213; a part of the orthographic projection of the first sub-portion 4313 on the first surface 4213 coincides with the first surface 4213; the entire orthographic projection of the first sub-portion 4313 on the first surface 4213 coincides with a part of the first surface 4213; or the orthographic projection of the first sub-portion 4313 on the first surface 4213 completely coincides with the first surface 4213, that is, the outer circumference of the surface that is of the first sub-portion 4313 and that faces the first surface 4213 is flush with the outer circumference of the first surface 4213. In this way, the second bare cell portion 43 can be configured to protect the first bare cell portion 42 from the side of the first surface 4213, thereby improving the safety of the battery 40.

The side surface 4214 includes a first side surface 42141 and a second side surface 42142. The first side surface 42141 and the second side surface 42142 are arranged in the circumferential direction of the first surface 4213 and are connected to each other. The tabs of the first bare cell portion 42 are disposed on the first side surface 42141. The second sub-portion 4314 is located on the side that the second side surface 42142 faces towards, and an orthographic projection of the second sub-portion 4314 on the second side surface 42142 overlaps the second side surface 42142. That is, a part of the orthographic projection of the second sub-portion 4314 on the second side surface 42142 coincides with a part of the second side surface 42142; a part of the orthographic projection of the second sub-portion 4314 on the second side surface 42142 coincides with the second side surface 42142; the entire orthographic projection of the second sub-portion 4314 on the second side surface 42142 coincides with a part of the second side surface 42142; or the orthographic projection of the second sub-portion 4314 on the second side surface 42142 completely coincides with the second side surface 42142, that is, a surface that is of the second sub-portion 4314 and that faces the second side surface 42142 has the same thickness as that of the second side surface 42142, and the outer circumference of the surface that is of the second sub-portion 4314 and that faces the second side surface 42142 is flush with the outer circumference of the second side surface 42142. In this way, the second bare cell portion 43 can be configured to protect the first bare cell portion 42 from the side of the second side surface 42142, thereby improving the safety of the battery 40.

Optionally, the first sub-portion 4313 and the second sub-portion 4314 may be independent of each other and physically separated, that is, the first sub-portion 4313 and the second sub-portion 4314 are independent bare cells. Certainly, the present application is not limited thereto, and in some other embodiments, the first sub-portion 4313 and the second sub-portion 4314 may be an integral structure.

Figure 13:
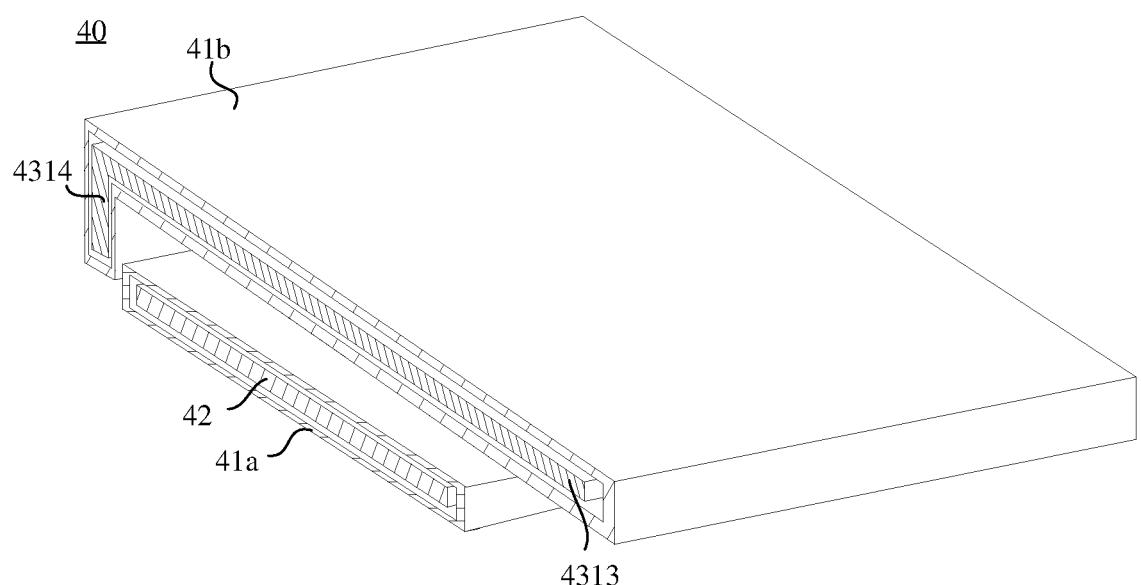
FIG. 13 is a perspective cross-sectional view of a battery according to some other embodiments of the present application.

In this example, still referring to FIG. 12, an accommodating cavity is formed in the housing 41, and the first bare cell portion 42 and the second bare cell portion 43 can be located in the accommodating cavity, so that the first bare cell portion 42 and the second bare cell portion 43 share the accommodating cavity. This not only helps to reduce the overall volume of the battery 40 but also can reduce the costs. Certainly, the present application is not limited thereto. FIG. 13 is a perspective cross-sectional view of a battery according to some other embodiments of the present application. In this example, the first bare cell portion 42 and the second bare cell portion 43 may also be located in different accommodating cavities of the housing 41. Specifically, still referring to FIG. 13, the housing 41 includes a first housing unit 41a and a second housing unit 41b. A part of the second housing unit 41b is located on a side that is of the first housing unit 41a and that faces the opening of the battery compartment 13, and the other part of the second housing unit 41b is located on a side that is of the first housing unit 41a and that faces the inner side surface of the battery compartment 13. A first accommodating cavity is formed in the first housing unit 41a, and a second accommodating cavity is formed in the second housing unit 41b. The first bare cell portion 42 is accommodated in the first accommodating cavity, and a shape of the first bare cell portion 42 can be adapted to that of the first housing unit 41a. The second bare cell portion 43 is accommodated in the second accommodating cavity, and a shape of the second bare cell portion 43 can be adapted to that of the second housing unit 41b.

Figures 14, 15:
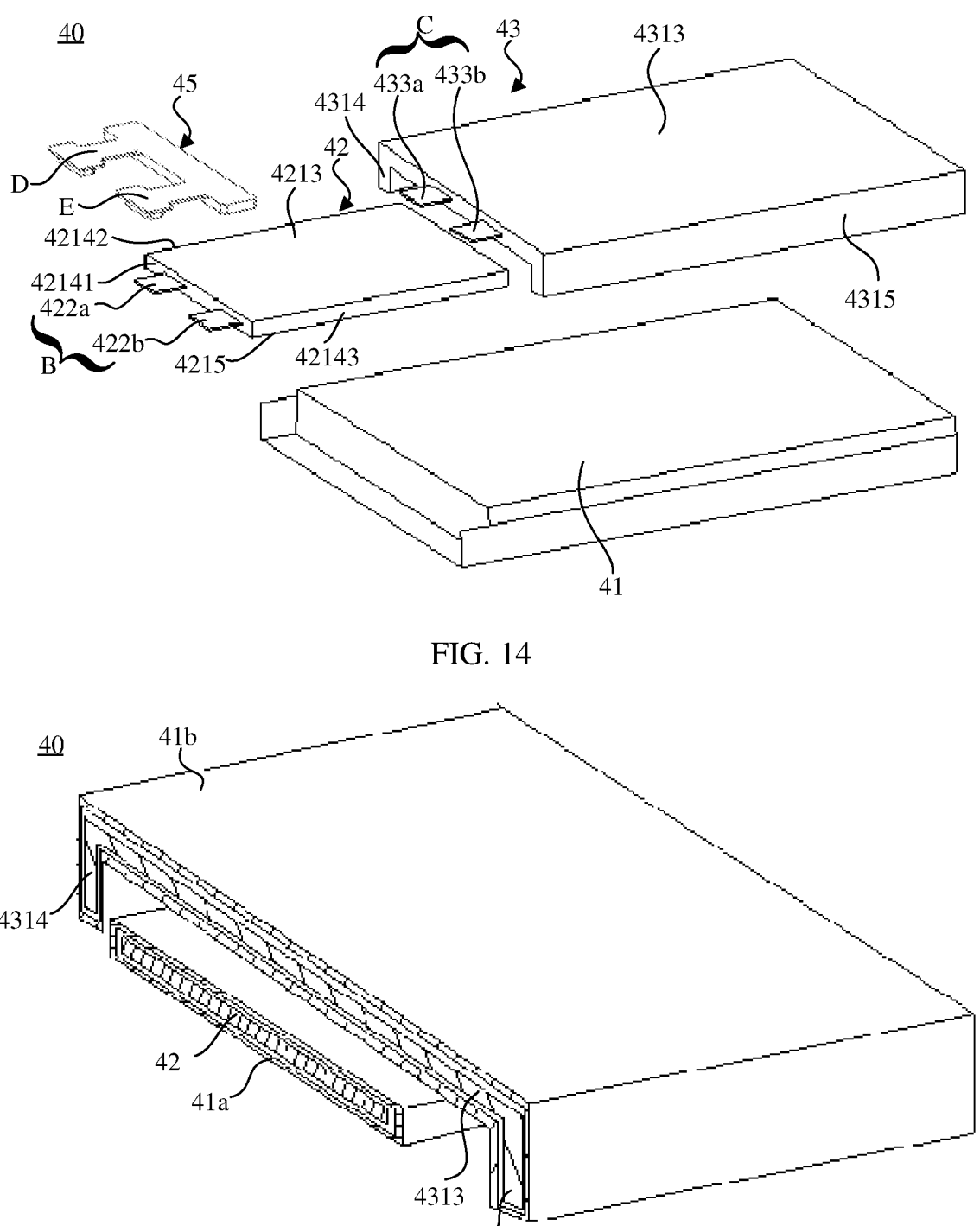
FIG. 14 is an exploded view of a battery according to some other embodiments of the present application.
FIG. 15 is a perspective cross-sectional view of a battery according to other embodiments of the present application.

In some other specific examples of this example, FIG. 14 is an exploded view of a battery according to some other embodiments of the present application. The second bare cell portion 43 includes a first sub-portion 4313, a second sub-portion 4314, and a third sub-portion 4315.

The first sub-portion 4313 is located on the side that the first surface 4213 faces towards, and an orthographic projection of the first sub-portion 4313 on the first surface 4213 overlaps the first surface 4213. That is, a part of the orthographic projection of the first sub-portion 4313 on the first surface 4213 coincides with a part of the first surface 4213; a part of the orthographic projection of the first sub-portion 4313 on the first surface 4213 coincides with the first surface 4213; the entire orthographic projection of the first sub-portion 4313 on the first surface 4213 coincides with a part of the first surface 4213; or the orthographic projection of the first sub-portion 4313 on the first surface 4213 completely coincides with the first surface 4213. In this way, the second bare cell portion 43 can be configured to protect the first bare cell portion 42 from the side of the first surface 4213, thereby improving the safety of the battery 40.

The side surface 4214 includes a first side surface 42141, a second side surface 42142, and a third side surface 42143. The first side surface 42141 and the second side surface 42142 are arranged in the circumferential direction of the first surface 4213 and are connected to each other. The third side surface 42143 is opposite to the second side surface 42142. The tabs of the first bare cell portion 42 are disposed on the first side surface 42141.

The second sub-portion 4314 is located on the side that the second side surface 42142 faces towards, and an orthographic projection of the second sub-portion 4314 on the second side surface 42142 overlaps the second side surface 42142. That is, a part of the orthographic projection of the second sub-portion 4314 on the second side surface 42142 coincides with a part of the second side surface 42142; a part of the orthographic projection of the second sub-portion 4314 on the second side surface 42142 coincides with the second side surface 42142; the entire orthographic projection of the second sub-portion 4314 on the second side surface 42142 coincides with a part of the second side surface 42142; or the orthographic projection of the second sub-portion 4314 on the second side surface 42142 completely coincides with the second side surface 42142. In this way, the second bare cell portion 43 can be configured to protect the first bare cell portion 42 from the side of the second side surface 42142, thereby improving the safety of the battery 40.

The third sub-portion 4315 is located on a side that the third side surface 42143 faces towards, and the orthographic projection of the third sub-portion 4315 on the third side surface 42143 overlaps the third side surface 42143. That is, a part of the orthographic projection of the third sub-portion 4315 on the third side surface 42143 coincides with a part of the third side surface 42143; a part of the orthographic projection of the third sub-portion 4315 on the third side surface 42143 coincides with the third side surface 42143; the entire orthographic projection of the third sub-portion 4315 on the third side surface 42143 coincides with a part of the third side surface 42143; or the orthographic projection of the third sub-portion 4315 on the third side surface 42143 completely coincides with the third side surface 42143, that is, a surface that is of the third sub-portion 4315 and that faces the third side surface 42143 has the same thickness as that of the third side surface 42143, and the outer circumference of the surface that is of the third sub-portion 4315 and that faces the third side surface 42143 is flush with the outer circumference of the third side surface 42143. In this way, the second bare cell portion 43 can be configured to protect the first bare cell portion 42 from the side of the third side surface 42143, thereby improving the safety of the battery 40.

Optionally, the first sub-portion 4313, the second sub-portion 4314, and the third sub-portion 4315 may be independent of each other and physically separated. That is, the first sub-portion 4313, the second sub-portion 4314, and the third sub-portion 4315 are independent bare cells. Certainly, the present application is not limited thereto, and in some other embodiments, the first sub-portion 4313, the second sub-portion 4314, and the third sub-portion 4315 may also be an integral structure. Alternatively, any two of the first sub-portion 4313, the second sub-portion 4314, and the third sub-portion 4315 are an integral structure, and the remaining one is an independent bare cell.

In this example, still referring to FIG. 14, an accommodating cavity is formed in the housing 41, and the first bare cell portion 42 and the second bare cell portion 43 can be located in the accommodating cavity, so that the first bare cell portion 42 and the second bare cell portion 43 share the accommodating cavity. This not only helps to reduce the overall volume of the battery 40 but also can reduce the costs. Certainly, the example is not limited thereto. FIG. 15 is a perspective cross-sectional view of a battery according to some other embodiments of the present application. In this example, the first bare cell portion 42 and the second bare cell portion 43 may also be located in different accommodating cavities of the housing 41. Specifically, still referring to FIG. 15, the housing 41 includes a first housing unit 41a and a second housing unit 41b. A part of the second housing unit 41b is located on a side that is of the first housing unit 41a and that faces the opening of the battery compartment 13, and the other part of the second housing unit 41b is located on a side that is of the first housing unit 41a and that faces the inner side surface of the battery compartment 13. A first accommodating cavity is formed in the first housing unit 41a, and a second accommodating cavity is formed in the second housing unit 41b. The first bare cell portion 42 is accommodated in the first accommodating cavity, and the shape of the first bare cell portion 42 can be adapted to that of the first housing unit 41a. The second bare cell portion 43 is accommodated in the second accommodating cavity, and the shape of the second bare cell portion 43 can be adapted to that of the second housing unit 41b.

Figure 16:
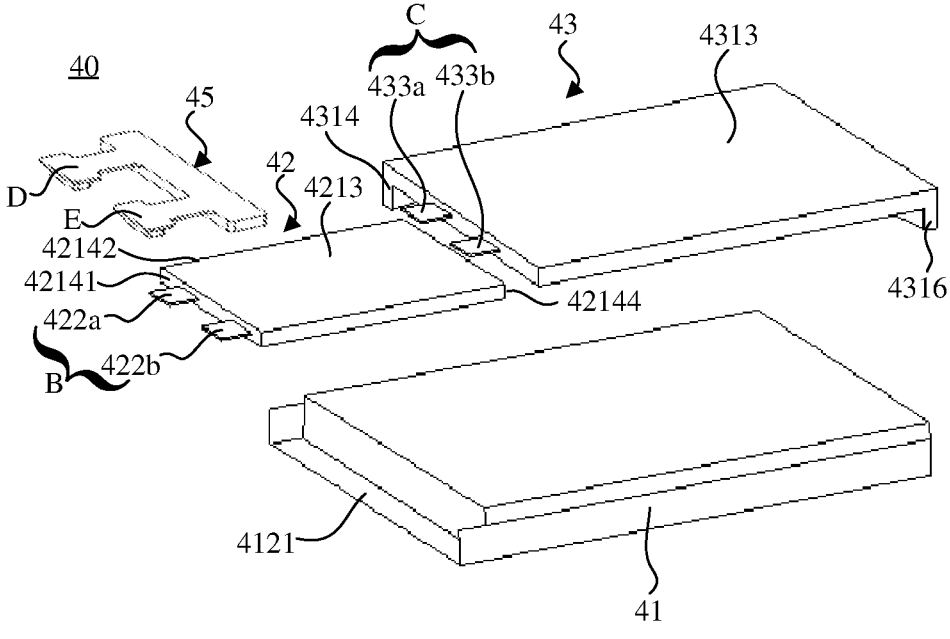
FIG. 16 is an exploded view of a battery according to some other embodiments of the present application.

In yet another example of this example, FIG. 16 is an exploded view of a battery according to some other embodiments of the present application. In this example, the second bare cell portion 43 includes a first sub-portion 4313, a second sub-portion 4314, and a fourth sub-portion 4316.

The first sub-portion 4313 is located on the side that the first surface 4213 faces towards, and an orthographic projection of the first sub-portion 4313 on the first surface 4213 overlaps the first surface 4213. That is, a part of the orthographic projection of the first sub-portion 4313 on the first surface 4213 coincides with a part of the first surface 4213; a part of the orthographic projection of the first sub-portion 4313 on the first surface 4213 coincides with the entire first surface 4213; the entire orthographic projection of the first sub-portion 4313 on the first surface 4213 coincides with a part of the first surface 4213; or the orthographic projection of the first sub-portion 4313 on the first surface 4213 completely coincides with the first surface 4213. In this way, the second bare cell portion 43 can be configured to protect the first bare cell portion 42 from the side of the first surface 4213, thereby improving the safety of the battery 40.

The side surface 4214 includes a first side surface 42141, a second side surface 42142, and a fourth side surface 42144. The first side surface 42141 and the second side surface 42142 are arranged in the circumferential direction of the first surface 4213 and are connected to each other, the fourth side surface 42144 is opposite to the first side surface 42141, and the tabs of the first bare cell portion 42 are disposed on the first side surface 42141.

The second sub-portion 4314 is located on the side that the second side surface 42142 faces towards, and an orthographic projection of the second sub-portion 4314 on the second side surface 42142 overlaps the second side surface 42142. That is, a part of the orthographic projection of the second sub-portion 4314 on the second side surface 42142 coincides with a part of the second side surface 42142; a part of the orthographic projection of the second sub-portion 4314 on the second side surface 42142 coincides with the second side surface 42142; the entire orthographic projection of the second sub-portion 4314 on the second side surface 42142 coincides with a part of the second side surface 42142; or the orthographic projection of the second sub-portion 4314 on the second side surface 42142 completely coincides with the second side surface 42142. In this way, the second bare cell portion 43 can be configured to protect the first bare cell portion 42 from the side of the second side surface 42142, thereby improving the safety of the battery 40.

The fourth sub-portion 4316 is located on the side that the fourth side surface 42144 faces towards, and an orthographic projection of the fourth sub-portion 4316 on the fourth side surface 42144 overlaps the fourth side surface 42144. That is, a part of the orthographic projection of the fourth sub-portion 4316 on the fourth side surface 42144 coincides with a part of the fourth side surface 42144; a part of the orthographic projection of the fourth sub-portion 4316 on the fourth side surface 42144 coincides with the fourth side surface 42144; the entire orthographic projection of the fourth sub-portion 4316 on the first surface fourth side surface 42144 coincides with a part of the fourth side surface 42144; or the orthographic projection of the fourth sub-portion 4316 on the fourth side surface 42144 completely coincides with the fourth side surface 42144. In this way, the second bare cell portion 43 can be configured to protect the first bare cell portion 42 from the side of the fourth side surface 42144, thereby improving the safety of the battery 40.

Optionally, the first sub-portion 4313, the second sub-portion 4314, and the fourth sub-portion 4316 may be independent of each other and physically separated, that is, the first sub-portion 4313, the second sub-portion 4314, and the fourth sub-portion 4316 are independent bare cells. Certainly, the present application is not limited thereto, and in some other embodiments, at least two of the first sub-portion 4313, the second sub-portion 4314, and the fourth sub-portion 4316 are an integral structure. Specifically, the first sub-portion 4313, the second sub-portion 4314, and the fourth sub-portion 4316 are an integral structure.

Figure 17:
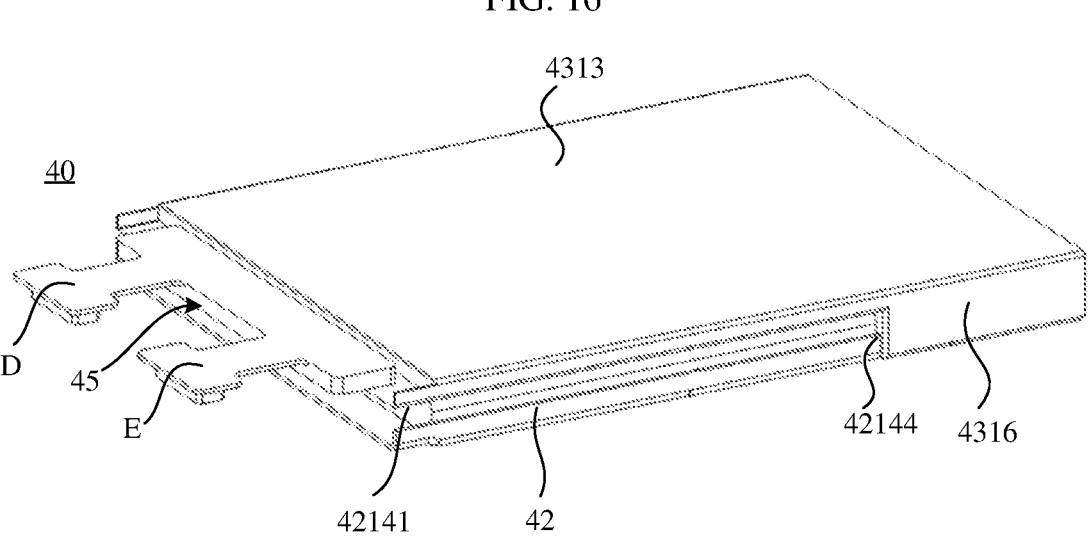
FIG. 17 is a schematic structural diagram of a part of a battery according to other embodiments of the present application, where a housing is not shown in FIG. 17.

In some other specific examples of this example, FIG. 17 is a schematic structural diagram of a part of a battery according to other embodiments of the present application, where a housing is not shown in FIG. 17. In this example, the second bare cell portion 43 includes a first sub-portion 4313 and a fourth sub-portion 4316.

The first sub-portion 4313 is located on the side that the first surface 4213 faces towards, and an orthographic projection of the first sub-portion 4313 on the first surface 4213 overlaps the first surface 4213. That is, a part of the orthographic projection of the first sub-portion 4313 on the first surface 4213 coincides with a part of the first surface 4213; a part of the orthographic projection of the first sub-portion 4313 on the first surface 4213 coincides with the first surface 4213; the entire orthographic projection of the first sub-portion 4313 on the first surface 4213 coincides with a part of the first surface 4213; or the orthographic projection of the first sub-portion 4313 on the first surface 4213 completely coincides with the first surface 4213. In this way, the second bare cell portion 43 can be configured to protect the first bare cell portion 42 from the side of the first surface 4213, thereby improving the safety of the battery 40.

The side surface 4214 includes a first side surface 42141 and a fourth side surface 42144. The first side surface 42141 is opposite to the fourth side surface 42144. The tabs of the first bare cell portion 42 are disposed on the first side surface 42141.

The fourth sub-portion 4316 is located on the side that the fourth side surface 42144 faces towards, and an orthographic projection of the fourth sub-portion 4316 on the fourth side surface 42144 overlaps the fourth side surface 42144. That is, a part of the orthographic projection of the fourth sub-portion 4316 on the fourth side surface 42144 coincides with a part of the fourth side surface 42144; a part of the orthographic projection of the fourth sub-portion 4316 on the fourth side surface 42144 coincides with the fourth side surface 42144; the entire orthographic projection of the fourth sub-portion 4316 on the fourth side surface 42144 coincides with a part of the fourth side surface 42144; or the orthographic projection of the fourth sub-portion 4316 on the fourth side surface 42144 completely coincides with the fourth side surface 42144. In this way, the second bare cell portion 43 can be configured to protect the first bare cell portion 42 from the side of the fourth side surface 42144, thereby improving the safety of the battery 40.

Optionally, the first sub-portion 4313 and the fourth sub-portion 4316 may be independent of each other and physically separated, that is, the first sub-portion 4313 and the fourth sub-portion 4316 are independent bare cells. Certainly, the present application is not limited thereto, and in some other embodiments, the separators of the first sub-portion 4313 and the fourth sub-portion 4316 are connected into an integral piece.

In this example, still referring to FIG. 17, an accommodating cavity is formed in the housing 41, and the first bare cell portion 42 and the second bare cell portion 43 can be located in the accommodating cavity, so that the first bare cell portion 42 and the second bare cell portion 43 share the accommodating cavity. This not only helps to reduce the overall volume of the battery 40 but also can reduce the costs. Certainly, this example is not limited thereto, and the first bare cell portion 42 and the second bare cell portion 43 may also be located in different accommodating cavities of the housing 41.

In some other specific examples of this example, the second bare cell portion 43 may also include the first sub-portion 4313, the second sub-portion 4314, the third sub-portion 4315, and the fourth sub-portion 4316. The side of the first surface 4213, the side of the second side surface 42142, the side of the third side surface 42143, and the side of the fourth side surface 42144 of the first bare cell portion 42 are all protected to improve the safety of the battery 40.

Example 3

This example provides improvement in that the second bare cell portion 43 protects the first bare cell portion 42 only from the side surface 4214. In this implementation, the second bare cell portion 43 may protect any one side surface 4214, any several side surfaces 4214, or all side surfaces 4214 of the plurality of side surfaces 4214 that are of the first bare cell portion 42 and that are arranged along the circumferential direction of the first surface 4213.

Figure 18:
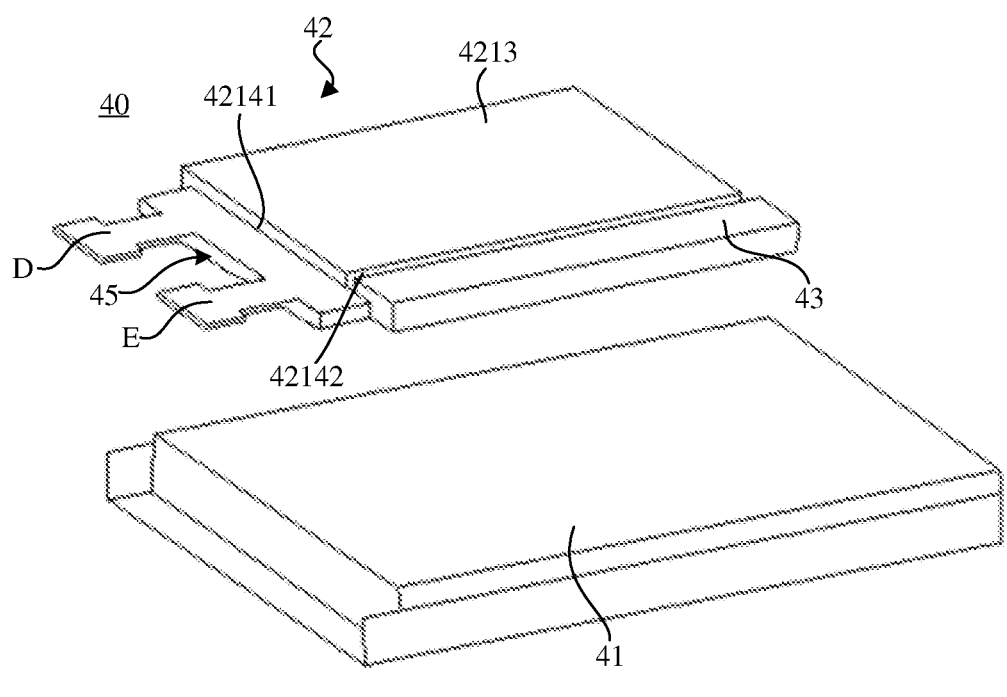
FIG. 18 is an exploded view of a battery according to some other embodiments of the present application.

In some specific examples of this example, FIG. 18 is an exploded view of a battery according to some other embodiments of the present application. In this example, the side surface 4214 includes a first side surface 42141 and a second side surface 42142, and the second side surface 42142 and the first side surface 42141 are arranged on the circumferential direction of the first surface 4213 and connected to each other, and tabs of the first bare cell portion 42 are arranged on the first side surface 42141. The second bare cell portion 43 is located on a side that the second side surface 42142 faces towards, and an orthographic projection of the second bare cell portion 43 on the second side surface 42142 overlaps the second side surface 42142. That is, a part of the orthographic projection of the second bare cell portion 43 on the second side surface 42142 coincides with a part of the second side surface 42142; a part of the orthographic projection of the second bare cell portion 43 on the second side surface 42142 coincides with the second side surface 42142; the entire orthographic projection of the second bare cell portion 43 on the second side surface 42142 coincides with a part of the second side surface 42142; or the orthographic projection of the second bare cell portion 43 on the second side surface 42142 completely coincides with the second side surface 42142. In this way, the second bare cell portion 43 can be configured to protect the first bare cell portion 42 from the side of the second side surface 42142, thereby improving the safety of the battery 40.

Figure 19:
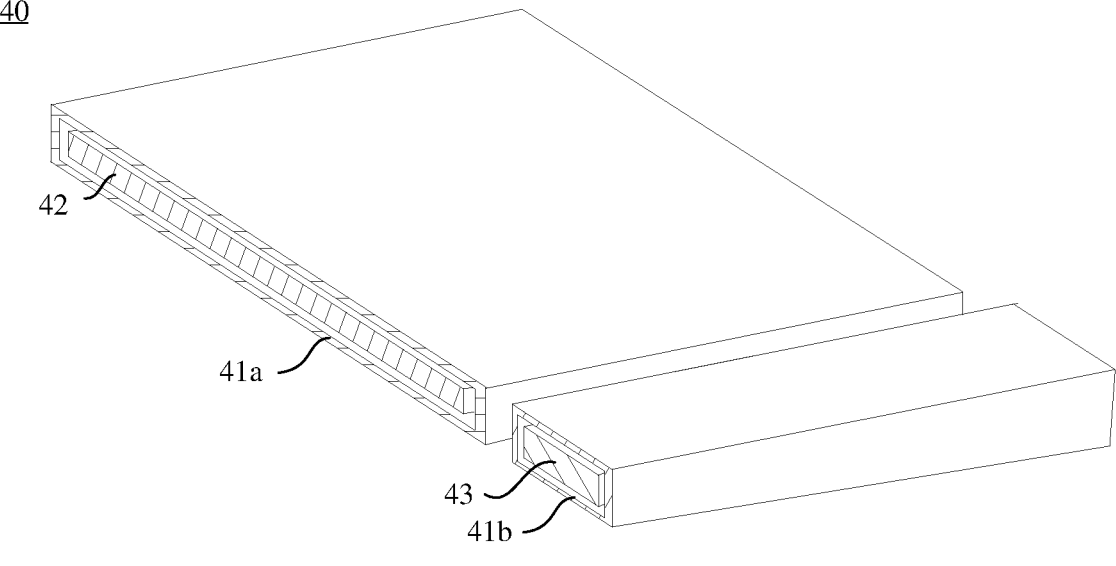
FIG. 19 is a perspective cross-sectional view of a battery according to some other embodiments of the present application.

Still referring to FIG. 18, in this example, an accommodating cavity is formed in the housing 41, and the first bare cell portion 42 and the second bare cell portion 43 are located in the accommodating cavity, so that the first bare cell portion 42 and the second bare cell portion 43 share the accommodating cavity. This not only helps to reduce the overall volume of the battery 40 but also can reduce the costs. Certainly, this example is not limited thereto. FIG. 19 is a perspective cross-sectional view of a battery according to some other embodiments of the present application. In this embodiment, the first bare cell portion 42 and the second bare cell portion 43 may also be located in different accommodating cavities of the housing 41. Specifically, the housing 41 includes a first housing unit 41a and a second housing unit 41b. The second housing unit 41b is located on a side that is of the first housing unit 41a and that is close to the second side surface 42142 and is fastened relative to the first housing unit 41a. A first accommodating cavity is formed in the first housing unit 41a, and a second accommodating cavity is formed in the second housing unit 41b. The first bare cell portion 42 is accommodated in the first accommodating cavity, and the shape of the first bare cell portion 42 can be adapted to that of the first housing unit 41a. The second bare cell portion 43 is accommodated in the second accommodating cavity, and the shape of the second bare cell portion 43 can be adapted to that of the second housing unit 41b. In this way, the first bare cell portion 42 and the second bare cell portion 43 can be independent of each other, thereby improving the safety of the first bare cell portion 42 and the second bare cell portion 43 in operation.

Figure 20:
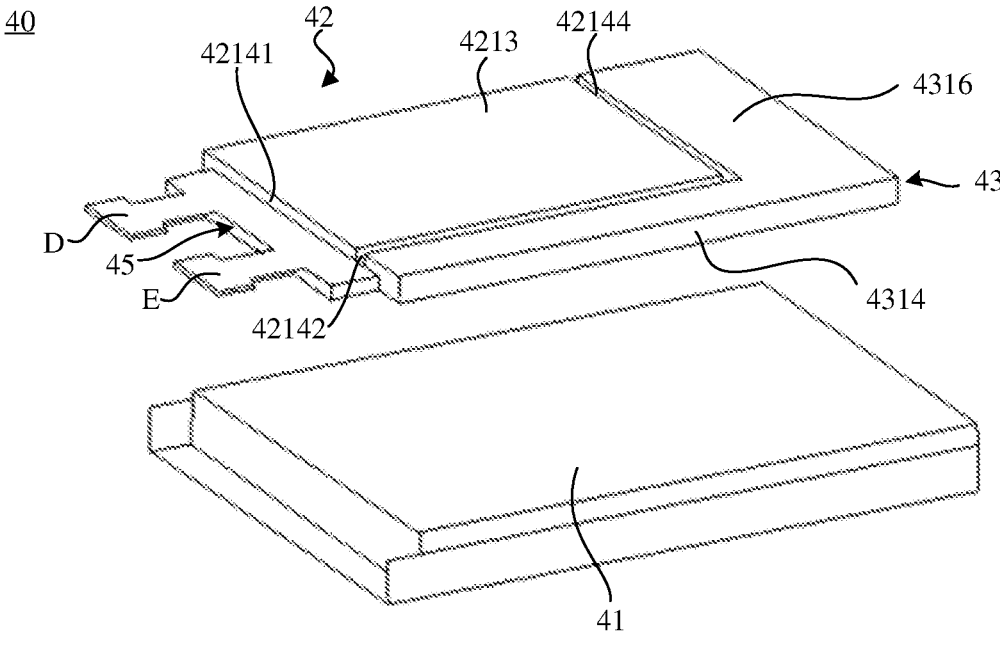
FIG. 20 is an exploded view of a battery according to some other embodiments of the present application.

In another specific example of this example, FIG. 20 is an exploded view of a battery according to some other embodiments of the present application. In this example, the side surface 4214 includes a first side surface 42141, a second side surface 42142, and a fourth side surface 42144. The second side surface 42142 and the first side surface 42141 are arranged in the circumferential direction of the first surface 4213 and are connected to each other. The tabs of the first bare cell portion 42 are disposed on the first side surface 42141, the fourth side surface 42144 is opposite to the first side surface 42141, and the second bare cell portion 43 includes a second sub-portion 4314 and a fourth sub-portion 4316.

The second sub-portion 4314 is located on the side that the second side surface 42142 faces towards, and an orthographic projection of the second sub-portion 4314 on the second side surface 42142 overlaps the second side surface 42142. That is, a part of the orthographic projection of the second sub-portion 4314 on the second side surface 42142 coincides with a part of the second side surface 42142; a part of the orthographic projection of the second sub-portion 4314 on the second side surface 42142 coincides with the second side surface 42142; the entire orthographic projection of the second sub-portion 4314 on the second side surface 42142 coincides with a part of the second side surface 42142; or the orthographic projection of the second sub-portion 4314 on the second side surface 42142 completely coincides with the second side surface 42142. In this way, the second bare cell portion 43 can be configured to protect the first bare cell portion 42 from the side of the second side surface 42142, thereby improving the safety of the battery 40.

The fourth sub-portion 4316 is located on the side that the fourth side surface 42144 faces towards, and an orthographic projection of the fourth sub-portion 4316 on the fourth side surface 42144 overlaps the fourth side surface 42144. That is, a part of the orthographic projection of the fourth sub-portion 4316 on the fourth side surface 42144 coincides with a part of the fourth side surface 42144; a part of the orthographic projection of the fourth sub-portion 4316 on the fourth side surface 42144 coincides with the fourth side surface 42144; the entire orthographic projection of the fourth sub-portion 4316 on the fourth side surface 42144 coincides with a part of the fourth side surface 42144; or the orthographic projection of the fourth sub-portion 4316 on the fourth side surface 42144 completely coincides with the fourth side surface 42144. In this way, the second bare cell portion 43 can be configured to protect the first bare cell portion 42 from the side of the fourth side surface 42144, thereby improving the safety of the battery 40.

Optionally, the second sub-portion 4314 and the fourth sub-portion 4316 may be independent of each other and physically separated, that is, the second sub-portion 4314 and the fourth sub-portion 4316 are independent bare cells. Certainly, the present application is not limited thereto, and in some other embodiments, the second sub-portion 4314 and the fourth sub-portion 4316 may be an integral structure.

Figure 21:
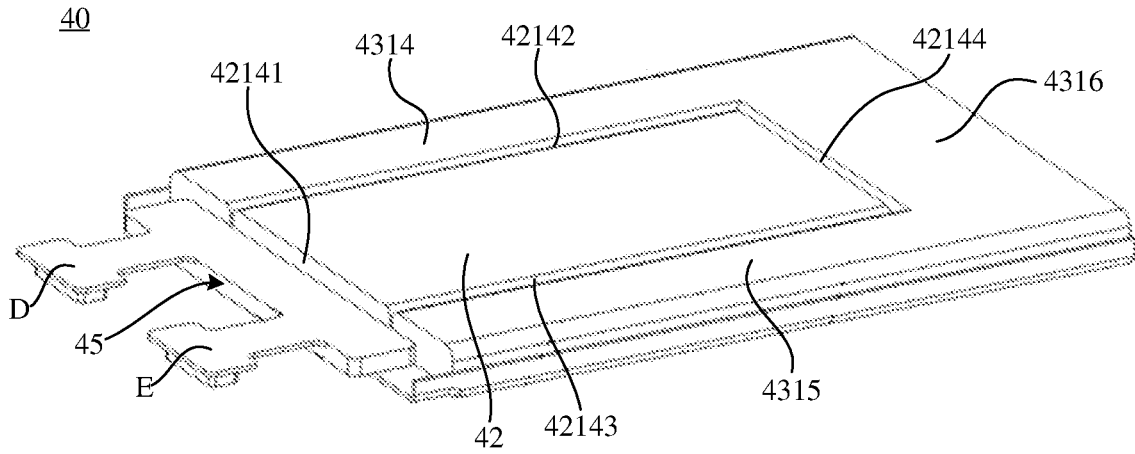
FIG. 21 is a schematic structural diagram of a part of a battery according to other embodiments of the present application, where a housing is not shown in FIG. 21.

In yet another specific example of this example, FIG. 21 is a schematic structural diagram of a part of a battery according to other embodiments of the present application, where a housing is not shown in FIG. 21. The side surface 4214 includes a first side surface 42141, a second side surface 42142, a third side surface 42143, and a fourth side surface 42144. The second side surface 42142 and the first side surface 42141 are arranged in the circumferential direction of the first surface 4213 and are connected to each other, the tabs of the first bare cell portion 42 are arranged on the first side surface 42141, the third side surface 42143 is opposite to the second side surface 42142, and the fourth side surface 42144 is opposite to the first side surface 42141. The second bare cell portion 43 includes a second sub-portion 4314, a third sub-portion 4315, and a fourth sub-portion 4316.

The second sub-portion 4314 is located on the side that the second side surface 42142 faces towards, and an orthographic projection of the second sub-portion 4314 on the second side surface 42142 overlaps the second side surface 42142. That is, a part of the orthographic projection of the second sub-portion 4314 on the second side surface 42142 coincides with a part of the second side surface 42142; a part of the orthographic projection of the second sub-portion 4314 on the second side surface 42142 coincides with the second side surface 42142; the entire orthographic projection of the second sub-portion 4314 on the second side surface 42142 coincides with a part of the second side surface 42142; or the orthographic projection of the second sub-portion 4314 on second side surface 42142 completely coincides with the second side surface 42142. In this way, the second bare cell portion 43 can be configured to protect the first bare cell portion 42 from the side of the second side surface 42142, thereby improving the safety of the battery 40.

The third sub-portion 4315 is located on a side that the third side surface 42143 faces towards, and the orthographic projection of the third sub-portion 4315 on the third side surface 42143 overlaps the third side surface 42143. That is, a part of the orthographic projection of the third sub-portion 4315 on the third side surface 42143 coincides with a part of the third side surface 42143; a part of the orthographic projection of the third sub-portion 4315 on the third side surface 42143 coincides with the third side surface 42143; the entire orthographic projection of the third sub-portion 4315 on the third side surface 42143 coincides with a part of the third side surface 42143; or the orthographic projection of the third sub-portion 4315 on the third side surface 42143 completely coincides with the third side surface 42143. In this way, the second bare cell portion 43 can be configured to protect the first bare cell portion 42 from the side of the third side surface 42143, thereby improving the safety of the battery 40.

The fourth sub-portion 4316 is located on the side that the fourth side surface 42144 faces towards, and an orthographic projection of the fourth sub-portion 4316 on the fourth side surface 42144 overlaps the fourth side surface 42144. That is, a part of the orthographic projection of the fourth sub-portion 4316 on the fourth side surface 42144 coincides with a part of the fourth side surface 42144; a part of the orthographic projection of the fourth sub-portion 4316 on the fourth side surface 42144 coincides with the fourth side surface 42144; the entire orthographic projection of the fourth sub-portion 4316 on the fourth side surface 42144 coincides with a part of the fourth side surface 42144; or the orthographic projection of the fourth sub-portion 4316 on the fourth side surface 42144 completely coincides with the fourth side surface 42144. In this way, the second bare cell portion 43 can be configured to protect the first bare cell portion 42 from the side of the fourth side surface 42144, thereby improving the safety of the battery 40.

As can be seen from the descriptions of example 1 to example 3, in the battery 40 provided in the embodiments of the present application, since both the first bare cell portion 42 and the second bare cell portion 43 are provided, compared with the battery 40 provided with one bare cell in the related art, on the one hand, the capacity may be divided into the first bare cell portion 42 and the second bare cell portion 43 while the total capacity of the battery 40 is not reduced, so that capacities of the first bare cell portion 42 and the second bare cell portion 43 are both lower than that of the battery 40 with one bare cell in the related art. Therefore, the risk of an internal short circuit and burning of the battery 40 caused by high capacities of the first bare cell portion 42 and the second bare cell portion 43 can be reduced at least to some extent, and the safety of the battery 40 can be improved. On the other hand, since the orthographic projection of the second bare cell portion 43 on the first surface 4213 overlaps the first surface 4213, and/or the orthographic projection of the second bare cell portion 43 on the side 4214 overlaps the side 4214, the second bare cell portion 43 can be used to protect the first bare cell portion 42 during the usage of the battery 40, to prevent the entire battery 40 from being damaged and scrapped.

In any specific example of example 1 to example 3, optionally, the second bare cell portion 43 is a fast-charge bare cell portion. The fast-charge bare cell portion specifically is a bare cell that can perform a charge and discharge process with a rate (C rate) not lower than a third preset threshold. The third preset threshold includes, but is not limited to, 1C, 2C, 2.5C, 3C, 4C, 4.5C, and the like.

Since volume energy density of the fast-charge bare cell portion is usually low, when the second bare cell portion 43 occupies a specific volume in the battery, the capacity of the second bare cell portion 43 can be reduced by disposing the second bare cell portion 43 as the fast-charge bare cell portion. In this way, less power is released when a short circuit occurs, the safety of the battery can be improved to some extent, and the possibility of fire outbreak and explosion of the battery can be reduced.

On this basis, optionally, the first bare cell portion 42 is a high-energy bare cell portion. The high-energy bare cell portion specifically is a bare cell portion whose volume energy density is not lower than a first preset threshold. The first preset threshold includes, but is not limited to, 500 Wh/L, 510 Wh/L, 520 Wh/L, 540 Wh/L, 550 Wh/L, 580 Wh/L, 600 Wh/L, and the like. A charge and discharge speed of the high-energy bare cell portion does not exceed a second preset threshold, and the second preset threshold includes, but is not limited to, 1c, 1.5c, 2c, 2.2c, 2.5c, 3c, and the like.

Since volume energy density of the high-energy bare cell portion is high, the battery life can be ensured.

According to the description of the above embodiments, when the first bare cell portion 42 is a high-energy bare cell portion and the second bare cell portion 43 is a fast-charge bare cell portion, volume ratios of the first bare cell portion 42 and the second bare cell portion 43 may be designed, so that the battery has a higher fast-charge feature or high-energy feature. Specifically, if a volume ratio of the first bare cell portion 42 in the battery 40 is larger, the volume energy density of the battery 40 is higher and the battery life is longer. If the volume ratio of the second bare cell portion 43 in the battery 40 is larger, the charge speed of the battery 40 is faster, which can meet the requirement in a scenario with a short charge time. Specifically, proper designs can be made in different application scenarios.

Certainly, the first bare cell portion 42 and the second bare cell portion 43 may also be bare cell portions that have neither the fast-charge feature nor the high-energy feature, or may be bare cell portions that both have the fast-charge feature or the high-energy feature. This is not specifically limited herein as long as the second bare cell portion 43 can be configured to protect the first bare cell portion 42 to improve the safety of the battery. For the convenience of description, the following description is only made on the basis that the first bare cell portion 42 is a high-energy bare cell portion and the second bare cell portion 43 is a fast-charge bare cell portion.

To design the first bare cell portion 42 as a high-energy bare cell portion and design the second bare cell portion 43 as a fast-charge bare cell portion, the size structure and material system of the two bare cells can be designed respectively.

In some embodiments, a thickness of the positive electrode sheet of the second bare cell portion 43 is smaller than that of the positive electrode sheet of the first bare cell portion 42, and a thickness of the negative electrode sheet of the second bare cell portion 43 is smaller than that of the negative electrode sheet of the first bare cell portion 42. As the thickness of the electrode sheet is smaller, the separator occupies a larger ratio in the same volume of the bare cell portion, a transmission path of lithium ions in the electrolyte is shorter, the charge and discharge speed is faster, and the fast charge performance is better. On the contrary, as the thickness of the electrode sheet is larger, the separator usually occupies a smaller ratio in the same volume of the bare cell portion, and therefore the volume energy density is higher and the high-energy performance is better. Therefore, in this embodiment, the thicknesses of the electrode sheets of the first bare cell portion 42 and the second bare cell portion 43 are designed to be inconsistent, that is, the structures of the first bare cell portion 42 and the second bare cell portion 43 are different, so that the first bare cell portion 42 reflects the high-energy feature and the second bare cell portion 43 reflects the fast-charge feature.

On the basis of the above embodiments, optionally, the thickness of the positive electrode sheet of the first bare cell portion 42 ranges from 80 μm to 120 μm. For example, the thickness of the positive electrode sheet of the first bare cell portion 42 is 85 μm, 90 μm, 95 μm, 100 μm, or 105 μm. The thickness of the negative electrode sheet of the first bare cell portion 42 ranges from 110 μm to 160 μm. For example, the thickness of the negative electrode sheet of the first bare cell portion 42 is 110 μm, 115 μm, 120 μm, 125 μm, 130 μm, 135 μm, 140 μm, 145 μm, 150 μm, or 155 μm. The thickness of the positive electrode sheet of the second bare cell portion 43 ranges from 40 μm to 80 μm. Further, the thickness of the positive electrode sheet of the second bare cell portion 43 ranges from 50 μm to 70 μm. For example, the thickness of the positive electrode sheet of the second bare cell portion 43 can be 55 μm, 60 μm, 65 μm, or 68 μm. The thickness of the negative electrode sheet of the second bare cell portion 43 ranges from 70 μm to 110 μm. For example, the thickness of the negative electrode sheet of the second bare cell portion 43 is 75 μm, 80 μm, 85 μm, 88 μm, or 100 μm.

On the basis of any one specific example of the above example 1 to example 3, optionally, the battery 40 may further include a third bare cell portion in addition to the first bare cell portion 42 and the second bare cell portion 43. The third bare cell portion is located on a side that the second surface 4215 of the first bare cell portion 42 faces towards. In this way, the first bare cell portion 42 can be protected from the side of the second surface 4215, to prevent debris from the bottom wall of the battery compartment from piercing into the first bare cell portion 42, thereby further improving the safety of the battery.

Figure 22:
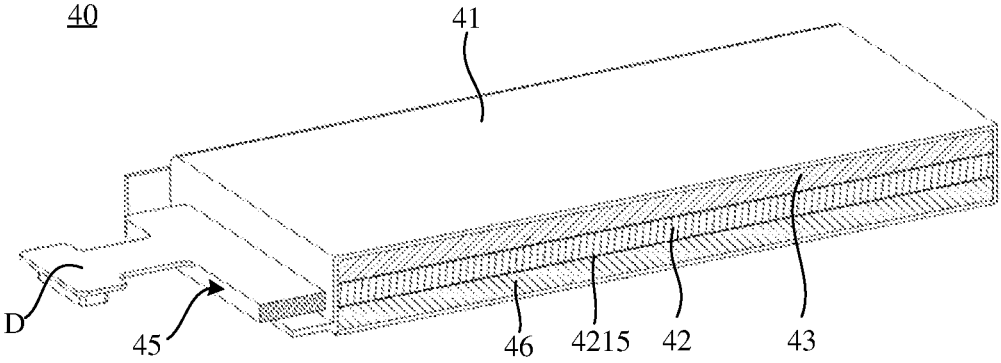
FIG. 22 is a perspective cross-sectional view in which a third bare cell portion is added to the battery shown in FIG. 9.
Figure 23:
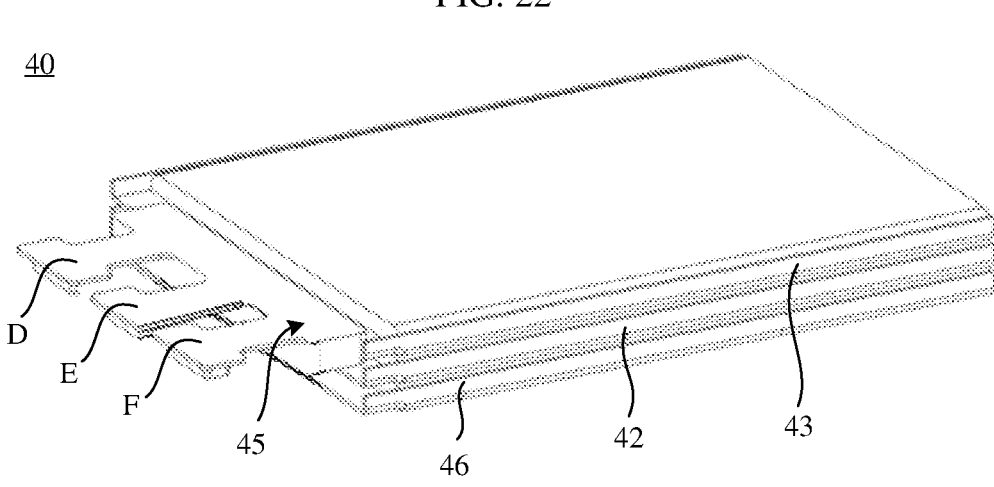
FIG. 23 is a schematic structural diagram of a part of the battery shown in FIG. 22, where a housing is not shown in FIG. 23.

For example, FIG. 22 is a perspective cross-sectional view in which a third bare cell portion is added to the battery shown in FIG. 9, and FIG. 23 is a schematic structural diagram of a part of the battery shown in FIG. 22, where a housing is not shown in FIG. 23. In this embodiment, the third bare cell portion 46 is located on a side that the second surface 4215 of the first bare cell portion 42 faces towards.

On this basis, the orthographic projection of the third bare cell portion 46 on the second surface 4215 overlaps the second surface 4215. That is, a part of the orthographic projection of the third bare cell portion 46 on the second surface 4215 coincides with a part of the second surface 4215; a part of the orthographic projection of the third bare cell portion 46 on the second surface 4215 coincides with the second surface 4215; the entire orthographic projection of the third bare cell portion 46 on the second surface 4215 coincides with a part of the second surface 4215; or the orthographic projection of the third bare cell portion 46 on the second surface 4215 completely coincides with the second surface 4215.

Herein, it can be understood that, that the orthographic projection of the third bare cell portion 46 on the second surface 4215 coincides with the second surface 4215 means: the outer periphery of the surface that is of the third bare cell portion 46 and that faces the second surface 4215 is flush with the outer periphery of the second surface 4215.

On this basis, the third bare cell portion 46, the second bare cell portion 43, and the first bare cell portion 42 may be located in a same accommodating cavity of the housing 41. The orthographic projection of the first bare cell portion 42 on the first surface 4213 completely coincides with the first surface 4213, and the orthographic projection of the third bare cell portion 46 on the second surface 4215 completely coincides with the second surface 4215. It can be understood that the third bare cell portion 46, the second bare cell portion 43, and the first bare cell portion 42 may also be located in different accommodating cavities of the housing 41. Alternatively, any two of the third bare cell portion 46, the second bare cell portion 43, and the first bare cell portion 42 are located in a same accommodating cavity, and the remaining one is located in an accommodating cavity of another separate housing.

A structure and a material of the third bare cell portion 46 may be the same as those of the second bare cell portion 43 described above. A shape of the third bare cell portion body of the third bare cell portion 46 may include, but is not limited to, a cuboid, a cylinder, or a cone.

The third bare cell portion 46 and the second bare cell portion 43 may be independent of each other and physically separated, and the third bare cell portion 46 and the first bare cell portion 42 may be independent of each other and physically separated. Certainly, the present application is not limited thereto. In some other embodiments, the third bare cell portion 46 and the second bare cell portion 43, and/or the third bare cell 46 and the first bare cell portion 42 may form an integral structure.

In some embodiments, the third bare cell portion 46 is a fast-charge bare cell portion. In this way, when the volume of the third bare cell portion 46 in the battery occupies a specific ratio, since the volume energy density of the fast-charge bare cell portion is low, the capacity of the third bare cell portion 46 is small. When the debris on the inner wall of the battery compartment pierces into the third bare cell portion 46, less energy is released, which can further reduce the risk of fire and explosion. In some other embodiments, the third bare cell portion 46 may be a high-energy bare cell portion, or is neither a fast-charge bare cell portion nor a high-energy bare cell portion.

With reference to the battery 40 described in any one of the above embodiments, optionally, in the battery 40, a ratio of a volume of all fast-charge bare cell portions to a sum of the volume of all the fast-charge bare cell portions and a volume of the high-energy bare cell portion ranges from 5% to 95%. For example, the ratio of the volume of all the fast-charge bare cell portions to the sum of the volume of all the fast-charge bare cell portions and the volume of the high-energy bare cell portion is 10% to 50%. In this way, both the fast-charge feature and the high-energy feature of the battery can be balanced.

The third bare cell portion 46 has at least two tabs (not shown in the figure), the at least two tabs include a positive electrode tab and a negative electrode tab, and the positive electrode tab and the negative electrode tab form a fifth charge and discharge port.

With reference to the battery 40 described in any one of the above embodiments, still referring to FIG. 6, FIG. 12, FIG. 14, FIG. 16, FIG. 17, FIG. 18, FIG. 20, FIG. 21, and FIG. 23, the protection board 45 has a first charge and discharge circuit and a second charge and discharge circuit. The first charge and discharge circuit and the second charge and discharge circuit are integrated on the protection board 45, which is not shown in the figure. The first charge and discharge circuit is electrically connected to the first bare cell portion 42 through the first charge and discharge port B. On this basis, the protection board 45 also has a third charge and discharge port D. The third charge and discharge port D is located on the first charge and discharge circuit. The protection board 45 is electrically connected to the power management module 52, the charge management module 51, and the charger in FIG. 2 through the third charge and discharge port D, so as to form a charge and discharge link. Similarly, the second charge and discharge circuit is electrically connected to the second bare cell portion 43 through the second charge and discharge port C. On this basis, the protection board 45 also has a fourth charge and discharge port E, and the fourth charge and discharge port E is located on the second charge and discharge circuit. The protection board 45 is electrically connected to the power management module 52, the charge management module 51, and the charger in FIG. 2 through the fourth charge and discharge port E, so as to form another charge and discharge link.

It should be noted that, when the battery further includes the third bare cell portion 46, referring to FIG. 23, the protection board 45 may also have a third charge and discharge circuit, and the third charge and discharge circuit is electrically connected to the third bare cell portion 46 through the fifth charge and discharge port. On this basis, the protection board 45 also has a sixth charge and discharge port F. The sixth charge and discharge port F is located on the third charge and discharge circuit. The protection board 45 is electrically connected to the power management module 52, the charge management module 51, and the charger in FIG. 2 through the sixth charge and discharge port F, so as to form still another charge and discharge link.

In this way, at least two charge and discharge links independent of each other are formed in the battery. When the second bare cell portion 43 is short-circuited due to piercing by an object such as a broken back cover or a screwdriver, the first bare cell portion 42 can be normally used. This avoids that the first bare cell portion 42 and the second bare cell portion 43 are short-circuited at the same time and release excessively high energy at the same time, thereby reducing the possibility of safety problems such as burning and explosion. In addition, when the battery has a specific volume, the battery can be charged and discharged at the same time through the two charge and discharge links, which can increase the charge and discharge speed of the battery 20. In addition, the at least two charge and discharge links may be used to manage charge and discharge and detect parameters such as a capacity, a quantity of cycle times, and a health state of one of the first bare cell portion 42 and the second bare cell portion 43, or manage charge and discharge and detect parameters such as capacities, quantities of cycle times, and health states of both the first bare cell portion 42 and the second bare cell portion 43. The performance and health state of the battery is used to the maximum extent. Besides, one bare cell portion is charged and the other bare cell portion is discharged at the same time.

Based on the foregoing embodiment, optionally, the power management module 52 is configured to discharge power of the second bare cell portion 43 of the battery 40 to a first preset threshold and then discharge the first bare cell portion 42. In this way, the second bare cell portion 43 discharges preferentially, so that power in the second bare cell portion 43 can be reduced. Even if the second bare cell portion 43 is damaged due to proximity to the opening of the battery compartment 13 and the inner side surface of the battery compartment 13, the risk of burning is reduced and the safety of the battery 40 is improved because the second bare cell portion 43 has less power.

Herein, it should be noted that that the power management module 52 discharges power of the second bare cell portion 43 of the battery 40 to a first preset threshold and then discharges the first bare cell portion 42 means: the power management module 52 discharges power of the second bare cell portion 43 of the battery 40 to the first preset threshold and then discharges both the first bare cell portion 42 and the second bare cell portion 43, or discharges only the first bare cell portion 42. That is, when discharging the first bare cell portion 42, the power management module 52 still discharges the second bare cell portion 43 of the battery 40, or when discharging the first bare cell portion 42, the power management module 52 can control the second bare cell portion 43 of the battery 40 to stop discharge.

Specifically, a value interval of the first preset threshold is [0, 80% SOC]. For example, the second preset threshold is 10% SOC, 20% SOC, 30% SOC, 40% SOC, 50% SOC, 60% SOC, or 70% SOC. Herein, the SOC (State of charge, state of charge) is used to reflect a remaining capacity of the battery, and a value of the SOC is defined as a ratio of the remaining capacity to the capacity of the battery. Exemplarily, 60% SOC means that the remaining capacity of the battery 40 accounts for 60% of the capacity of the battery.

Based on the foregoing embodiment, the charge management module 51 is configured to charge power of the second bare cell portion 43 of the battery 40 to a second preset threshold and then charge the first bare cell portion 42 of the battery 40. That is, the charge management module 51 is configured to charge the power of the second bare cell portion 43 of the battery 40 to the second preset threshold, and then start charging the first bare cell portion 42 of the battery 40. Besides, when charging the first bare cell portion 42 of the battery 40, the charge management module 51 still charges the second bare cell portion 43 of the battery 40.

Therefore, an entire charge process of the battery 40 is divided into two stages:

The first stage is: the second bare cell portion 43 is charged, and the first bare cell portion 42 is not charged before the power of the second bare cell portion 43 reaches the second preset threshold. In this way, the charge speed of the second bare cell portion 43 with a relatively thin electrode sheet is faster. When power of the battery 40 is exhausted, the second bare cell portion 43 is charged preferentially, to replenish power of the battery 40 in a timely manner and facilitate usage of a user. In addition, management of the battery 40 is more intelligent.

The second stage is: when the power of the second bare cell portion 43 of the battery 40 is charged to the second preset threshold, both the first bare cell portion 42 and the second bare cell portion 43 are charged. This better helps to increase the charge speed of the battery, and facilitate timely replenishment of the power of the battery 40 and the usage of the user. In addition, management of the battery 40 is more intelligent.

Specifically, the value interval of the second preset threshold is [60% SOC, 100% SOC]. For example, the second preset threshold is 65% SOC, 66% SOC, 70% SOC, 75% SOC, 80% SOC, 85% SOC, or 90% SOC.

According to the descriptions of the foregoing embodiments, an example in which the electronic device is a mobile phone is used to describe a relationship among the safety feature, the high-energy feature, and the fast charge feature of the battery 40.

Figure 24:
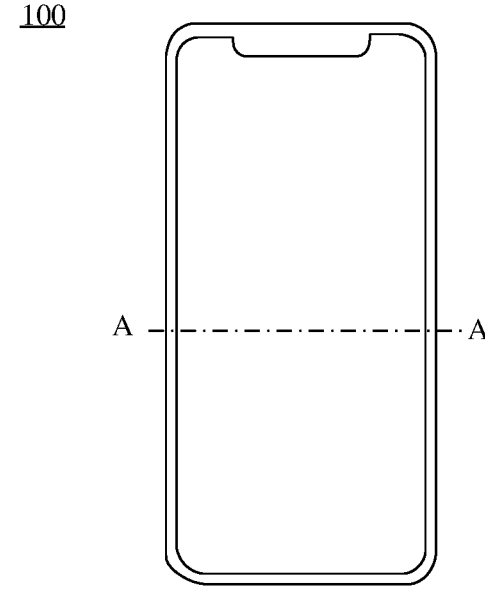
FIG. 24 is a schematic diagram of a front structure of an electronic device according to some embodiments of the present application.
Figure 25:
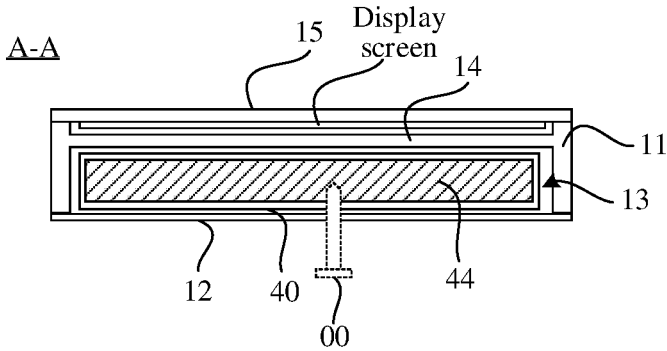
FIG. 25 is a schematic cross-sectional structural diagram of the electronic device shown in FIG. 24 at a line A-A.

Specifically, FIG. 24 is a schematic diagram of a front structure of an electronic device 100 according to some embodiments of the present application, and FIG. 25 is a schematic cross-sectional structural diagram of the electronic device 100 shown in FIG. 24 at a line A-A. In this embodiment, the battery 40 includes only one bare cell 44.

Figure 26:
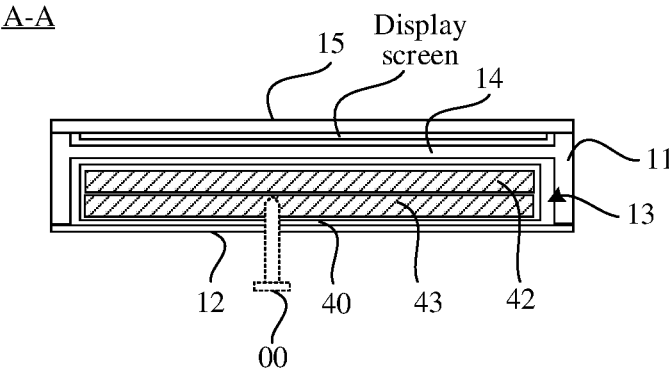
FIG. 26 is another schematic cross-sectional structural diagram of the electronic device shown in FIG. 24 at a line A-A.

FIG. 26 is another schematic cross-sectional structural diagram of the electronic device 100 shown in FIG. 24 at a line A-A. In this embodiment, the battery 40 includes a first bare cell portion 42 and a second bare cell portion 43. The second bare cell portion 43 is located on a side of the first bare cell portion 42 close to a back cover 12 of the mobile phone, and the second bare cell portion 43 and the first bare cell portion 42 are stacked. The second bare cell portion 43 is a fast-charge bare cell portion, and the first bare cell portion 42 is a high-energy bare cell portion.

Parameters of the battery 40 in the electronic device shown in FIG. 25 and parameters of the battery 40 in the electronic device shown in FIG. 26 may include the following embodiment 1 and embodiment 2.

Embodiment 1

Sizes, charge rates, capacities, and charge speeds (that is, charge capacities per 10 minutes) of the bare cell portions of the two batteries 40 are listed in Table 1 below. Specifically, the parameters of the battery 40 shown in FIG. 25 are described in the "battery before improvement" section in Table 1, and the parameters of the battery 40 shown in FIG. 26 are described in the "battery after improvement" section in Table 1.

TABLE 1

| Battery type | | Size | Charge rate | Capacity/ mAh | Charge speed (charge capacity per 10 minutes) |
|---|---|---|---|---|---|
| battery after improvement | second bare cell portion 43 | 3.0*65*85 mm | 10C | 2291 | 2291 |
| | first bare cell portion 42 | 2.0*65*85 mm | 1.5C | 2051 | 342 |
| | entire battery | / | / | 4342 | 2634 |
| battery before improvement | | 5.0*65*85 mm | 3C | 4568 | 2239 |

As can be seen from Table 1, a ratio of a volume of the second bare cell portion 43 in the battery after improvement of the present application to a total volume of the battery (that is, a volume ratio) is 60%. The charge speed after improvement is about 18% faster than that of the battery 40 before improvement, and the total capacity of the battery 40 after improvement is slightly lower than that of the battery 40 before improvement. Therefore, the battery 40 after improvement reflects the fast charge feature.

Based on embodiment 1, still refer to FIG. 25 and FIG. 26. A steel nail 00 is used to pierce into the battery 40 before improvement and the battery 40 after improvement through the back cover 12 of the mobile phone, so as to compare and test safety performance of the battery 40 after improvement. Specifically, test results are shown in Table 2 below.

TABLE 2

| Battery type | Safety test condition | Quantity of batteries | Result |
|---|---|---|---|
| battery after improvement | 1. The capacity of the second bare cell portion 43 is reduced to ≤70% SOC, and the capacity of the first bare cell portion 42 is 100% SOC; and 2. The steel nail oo with a diameter of 2.5 mm pierces into the battery through the back cover 12 of the mobile phone at a speed of 150 mm/S, the second bare cell portion 43 pierces into the battery 40 and a depth at which the second bare cell portion 43 is pierced into is 3.0 mm, and the first bare cell portion 42 is not pierced into. | 10 pcs | the entire first bare cell portion 42 is desirable and generates less heat |
| battery before improvement | 1. The capacity of the battery is reduced to 50% SOC; and 2. The steel nail oo with a diameter of 2.5 mm pierces into the battery with a piercing depth of 3.0 mm through the back cover 12 of the mobile phone at a speed of 150 mm/S. | 10 pcs | the entire battery is damaged and generates more heat |

As can be seen from Table 2, the battery after improvement in this embodiment allows a piercing depth of 3.0 mm by a foreign object, and has higher safety performance.

Embodiment 2

Sizes, charge rates, capacities, and charge speeds (charge capacities per 10 minutes) of the bare cell portions of the two batteries 40 are listed in Table 3 below. Specifically, the parameters of the battery 40 shown in FIG. 25 are described in the "battery before improvement" section in Table 3, and the parameters of the battery 40 shown in FIG. 26 are described in the "battery after improvement" section in Table 3.

TABLE 3

| Battery typ | | Size | Charge rate | Capacity/ mAh | Charge speed (charge capacity per 10 minutes)/ |
|---|---|---|---|---|---|
| battery after improvement | second bare cell portion 43 | 0.5*65*85 mm | 5C | 428 | 314 |
| | first bare cell portion 42 | 4.5*65*85 mm | 3C | 4101 | 2010 |
| | entire battery | / | / | 4529 | 2323 |
| battery before improvement | | 5.0*65*85 mm | 3C | 4568 | 2239 |

According to Table 3, the volume ratio of the second bare cell portion 43 in the battery after improvement in this embodiment is smaller than that of the second bare cell portion 43 in the battery after improvement in Embodiment 1. Specifically, the volume ratio of the second bare cell portion 43 in this embodiment is 10%. On this basis, the charge speed of the battery after improvement 40 in this embodiment is increased by about 4%, which is smaller than a charge speed increase of the battery after improvement in embodiment 1. The battery 40 still reflects the fast charge feature. However, the capacity of the battery 40 after improvement is basically the same as the capacity of the battery before improvement, and the capacity of the battery 40 after improvement in this embodiment is higher than that of the battery 40 after improvement in embodiment 1.

Based on embodiment 2, still refer to FIG. 25 and FIG. 26. A steel nail 00 is used to pierce into the battery 40 before improvement and the battery 40 after improvement through the back cover 12 of the mobile phone, so as to compare and test safety performance of the battery 40 after improvement. Specifically, test results are shown in Table 4 below.

performance, an allowable depth of piercing by a foreign object is also correspondingly reduced, that is, the safety performance is lower. As can be seen, the relationship among the high-energy feature, the fast-charge feature, and the safety feature of the battery after improvement of the present application is as follows: as the fast-charge feature is enhanced, the volume ratio and the thickness of the second bare cell portion 43 are larger, an allowable depth of piercing by a foreign object is larger, and the safety performance is higher. However, as the fast-charge feature is enhanced, the volume ratio of the first bare cell portion 42 is reduced and the high-energy performance of the battery is lower. On the contrary, as the high-energy performance is enhanced, the volume ratio of the first bare cell portion 42 is higher, the volume ratio of the second bare cell portion 43 is lower, the fast-charge feature is weaker, the thickness of the second bare cell portion 43 is smaller, an allowable depth of piercing by a foreign object is smaller, and the safety performance is lower.

TABLE 4

| Battery type | Safety test condition | Quantity of batteries | Result |
|---|---|---|---|
| battery after improvement | 1. The capacity of the second bare cell portion 43 is reduced to ≤70% SOC, and the capacity of the first bare cell portion 42 is 100% SOC; and 2. A steel nail with a diameter of 2.5 mm pierces into the battery through the back cover 12 of the mobile phone at a speed of 150 mm/S, the second bare cell portion 43 pierces into the battery 40 and a depth at which the second bare cell portion 43 is pierced into is 0.5 mm, and the first bare cell portion 42 is not pierced into. | 10 pcs | the entire first bare cell portion 42 is desirable and generates less heat |
| battery before improvement | 1. The capacity of the battery is reduced to 50% SOC; and 2. The steel nail oo with a diameter of 2.5 mm pierces into the battery with a piercing depth of 0.5 mm through the back cover 12 of the mobile phone at a speed of 150 mm/S. | 10 pcs | the entire battery is damaged and generates more heat |

As can be seen from Table 4, the battery after improvement in this embodiment allows only a piercing depth of 0.5 mm by a foreign object, and has safety performance to some extent. However, the safety performance is lower than that of the battery after improvement in embodiment 1.

Based on embodiment 2, if the ratio of the volume of the second bare cell portion 43 in the battery after improvement of the present application to the total volume of the battery is further reduced, the capacity of the battery 40 is larger than that of the battery before improvement. In this way, the battery 40 reflects the high-energy feature. However, as the volume ratio of the second bare cell portion 43 after improvement is reduced, the thickness of the second bare cell portion 43 is also reduced. While ensuring safety In the descriptions of this specification, the specific features, structures, materials, or characteristics may be combined in a proper manner in any one or more of the embodiments or examples.

Finally, it should be noted that the foregoing embodiments are merely intended for describing the technical solutions of this application, but not for limiting this application. Although this application is described in detail with reference to the foregoing embodiments, a person of ordinary skill in the art should understand that modifications may still be made to the technical solutions described in the foregoing embodiments or equivalent replacements may be made to some technical features thereof, and such modifications or replacements do not cause the essence of corresponding technical solutions to depart from the spirit and scope of the technical solutions in the embodiments of this application.

What is claimed is:

1. A battery, comprising:
a first bare cell portion, wherein the first bare cell portion has a first surface and a side surface connected to the first surface, the first surface is configured to face towards a same direction as that of an opening of a battery compartment of an electronic device when the battery is installed in the battery compartment, and the side surface is configured to face towards an inner side surface of the battery compartment of the electronic device when the battery is installed in the battery compartment; and
a second bare cell portion, wherein the second bare cell portion is located on a side that the first surface faces, and an orthographic projection of the second bare cell portion on the first surface overlaps the first surface, and/or the second bare cell portion is located on a side that the side surface faces, and an orthographic projection of the second bare cell portion on the side surface overlaps the side surface.

2. The battery according to claim 1, wherein the first cell portion is a high-energy bare cell portion, and the second bare cell portion is a fast-charge bare cell portion.

3. The battery according to claim 1, wherein a thickness of a negative electrode sheet of the second bare cell portion is smaller than that of a negative electrode sheet of the first bare cell portion.

4. The battery according to claim 1, wherein the second bare cell portion comprises a first sub-portion, the first sub-portion is located on the side that the first surface faces towards, and an orthographic projection of the first sub-portion on the first surface overlaps the first surface.

5. The battery according to claim 1, wherein the side surface comprises a first side surface and a second side surface, and the second side surface and the first side surface are arranged on the circumferential direction of the first surface and connected to each other; and
tabs of the first bare cell portion are arranged on the first side surface, the second bare cell portion comprises a second sub-portion, the second sub-portion is located on a side that the second side surface faces towards, and an orthographic projection of the second sub-portion on the second side surface overlaps the second side surface.

6. The battery according to claim 5, wherein the side surface further comprises a third side surface, and the third side surface is opposite to the second side surface; and
the second bare cell portion further comprises a third sub-portion, the third sub-portion is located on a side that the third side surface faces towards, and an orthographic projection of the third sub-portion on the third side surface overlaps the third side surface.

7. The battery according to claim 5, wherein the side surface further comprises a fourth side surface, and the fourth side surface is opposite to the first side surface; and
the second bare cell portion further comprises a fourth sub-portion, the fourth sub-portion is located on a side that the fourth side surface faces towards, and an orthographic projection of the fourth sub-portion on the fourth side surface overlaps the fourth side surface.

8. The battery according to claim 4, wherein the side surface comprises a first side surface and a fourth side surface, and the first side surface is opposite to the fourth side surface; and tabs of the first bare cell portion are arranged on the first side surface, the second bare cell portion further comprises a fourth sub-portion, the fourth sub-portion is located on a side that the fourth side surface faces towards, and an orthographic projection of the fourth sub-portion on the fourth side surface overlaps the fourth side surface.

9. The battery according to claim 1, wherein the first bare cell portion further has a second surface, and the second surface is opposite to the first surface; and
the battery further comprises:
a third bare cell portion, wherein the third bare cell portion is located on a side that the second surface faces towards, and an orthographic projection of the third bare cell portion on the second surface overlaps the second surface.

10. The battery according to claim 1, wherein a thickness of a positive electrode sheet of the first bare cell portion ranges from 80 μm to 120 μm; and
a thickness of a negative electrode sheet of the first bare cell portion ranges from 110 μm to 160 μm.

11. The battery according to claim 1, wherein a thickness of a positive electrode sheet of the second bare cell portion ranges from 40 μm to 80 μm; and
a thickness of a negative electrode sheet of the second bare cell portion ranges from 70 μm to 110 μm.

12. The battery according to claim 1, further comprising:
a housing, wherein the first bare cell portion and the second bare cell portion are located in the housing.

13. The battery according to claim 12, wherein an accommodation cavity is formed in the housing, and the first bare cell portion and the second bare cell portion are both located in the accommodation cavity.

14. The battery according to claim 12, wherein the housing comprises a first housing unit and a second housing unit;
a first accommodating cavity is formed in the first housing unit, and the first bare cell portion is accommodated in the first accommodating cavity; and
the second housing unit is located outside the first housing unit and is fastened relative to the first housing unit, a second accommodating cavity is formed in the second housing unit, and the second bare cell portion is accommodated in the second accommodating cavity.

15. The battery according to claim 12, wherein tabs of the first bare cell portion and tabs of the second bare cell portion penetrate through the housing to extend out of the housing, the tabs of the first bare cell portion form a first charge and discharge port, and the tabs of the second bare cell portion form a second charge and discharge port;
the battery further comprises a protection board, and the protection board has a first charge and discharge circuit, a second charge and discharge circuit, a third charge and discharge port, and a fourth charge and discharge port;
the first charge and discharge circuit is electrically connected to the first bare cell portion through the first charge and discharge port, the third charge and discharge port is located on the first charge and discharge circuit, and the protection board is configured to electrically connect to a power management module, a charge management module, and a charger through the third charge and discharge port, to form a charge and discharge link; and
the second charge and discharge circuit is electrically connected to the second bare cell portion through the second charge and discharge port, the fourth charge and discharge port is located on the second charge and discharge circuit, and the protection board is configured to electrically connect to the power management module, the charge management module, and the charger through the fourth charge and discharge port, to form another charge and discharge link.

16. An electronic device, comprising:

a housing, wherein a battery compartment is arranged in the housing, and the battery compartment has an opening; and a battery, comprising:

a first bare cell portion, wherein the first bare cell portion has a first surface and a side surface connected to the first surface, the first surface is configured to face towards a same direction as that of the opening of the battery compartment of the electronic device when the battery is installed in the battery compartment, and the side surface is configured to face towards an inner side surface of the battery compartment of the electronic device when the battery is installed in the battery compartment; and a second bare cell portion, wherein the second bare cell portion is located on a side that the first surface faces, and an orthographic projection of the second bare cell portion on the first surface overlaps the first surface, and/or the second bare cell portion is located on a side that the side surface faces, and an orthographic projection of the second bare cell portion on the side surface overlaps the side surface, wherein the battery is installed in the battery compartment, the first surface of the first bare cell portion in the battery faces a same direction as that of the opening of the battery compartment, and the side surface of the first bare cell portion faces towards the inner side surface of the battery compartment.

17. The electronic device according to claim 16, further comprising:

a power management module, wherein the power management module is electrically connected to the battery, and the power management module is configured to discharge power of the second bare cell portion of the battery to a first preset threshold and then discharge the first bare cell portion.

18. The electronic device according to claim 17, wherein a value interval of the first preset threshold is [0, 80% SOC].

19. The electronic device according to claim 16, further comprising:

a charge management module, wherein the charge management module is electrically connected to the battery, and the charge management module is configured to charge power of the second bare cell portion of the battery to a second preset threshold and then charge the first bare cell portion of the battery.

20. The electronic device according to claim 19, wherein a value interval of the second preset threshold is [60% SOC, 100% SOC].

* * * * *